(12) United States Patent
Kotliar

(10) Patent No.: US 6,401,487 B1
(45) Date of Patent: Jun. 11, 2002

(54) HYPOXIC FIRE PREVENTION AND FIRE SUPPRESSION SYSTEMS WITH BREATHABLE FIRE EXTINGUISHING COMPOSITIONS FOR HUMAN OCCUPIED ENVIRONMENTS

(76) Inventor: Igor K. Kotliar, 50 Lexington Ave. #249, New York, NY (US) 10010

( * ) Notice: Subject to any disclaimer, the term of this patent is extended or adjusted under 35 U.S.C. 154(b) by 0 days.

(21) Appl. No.: 09/854,108

(22) Filed: May 11, 2001

Related U.S. Application Data

(63) Continuation-in-part of application No. 09/750,801, filed on Dec. 28, 2000, and a continuation-in-part of application No. 09/566,506, filed on May 8, 2000, and a continuation-in-part of application No. 09/551,026, filed on Apr. 17, 2000.

(51) Int. Cl.[7] .................................................. F25J 1/00
(52) U.S. Cl. .............................. 62/640; 62/78; 169/45; 169/61
(58) Field of Search ................................ 62/78; 169/45, 169/56, 61

(56) References Cited

U.S. PATENT DOCUMENTS

| | | | |
|---|---|---|---|
| 4,896,514 A | * 1/1990 | Sugiyama et al. | 62/78 |
| 5,063,753 A | * 11/1991 | Woodruff | 62/78 |
| 5,388,413 A | * 2/1995 | Major et al. | 62/911 |
| 5,472,480 A | * 12/1995 | Barbe | 95/54 |
| 5,649,995 A | * 7/1997 | Gast, Jr. | 95/54 |
| 5,799,495 A | * 9/1998 | Gast, Jr. | 62/78 |
| 5,799,652 A | * 9/1998 | Kotliar | 128/205.11 |
| 5,921,091 A | * 7/1999 | Foss et al. | 62/46.1 |
| 6,012,533 A | * 1/2000 | Cramer | 169/45 |

* cited by examiner

Primary Examiner—Ronald Capossela
(74) Attorney, Agent, or Firm—Fire PASS Corp.

(57) ABSTRACT

Fire prevention and suppression systems and breathable fire-extinguishing compositions are provided for rooms, houses and buildings, transportation tunnels and vehicles, underground and underwater facilities, marine vessels, submarines, passenger and military aircraft, space stations and vehicles, military installations and vehicles, and all other human occupied objects and facilities. The system provides a breathable hypoxic fire-preventative atmosphere at standard atmospheric or local ambient pressure. The system employs an oxygen-extraction apparatus supplying oxygen-depleted air inside a human-occupied area or storing it in a high-pressure container for use in case of fire. A breathable fire-extinguishing composition is introduced for constant fire-preventive environments, being mostly a mixture of nitrogen and oxygen and having oxygen content ranging from 12% to 17%. A fire-suppression system is provided employing a fire-extinguishing composition with oxygen concentration under 16%, so when released it creates a breathable fire-suppressive atmosphere having oxygen concentration of approximately 16% (or lower if needed) with possible addition of carbon dioxide. A technology for automatically maintaining a breathable fire-preventive composition on board a human-occupied hermetic object is provided by introducing inert ballast that automatically maintains oxygen content under the Hypoxic Threshold. An aircraft fire prevention and suppression systems are provided utilizing hypoxic fire extinguishing compositions for producing breathable atmosphere onboard having fire-retarding properties.

32 Claims, 25 Drawing Sheets

Altitude or hypobaric environment

Normbaric hypoxic environment

Normbaric normoxic environment

● – oxygen molecules     O – nitrogen molecules

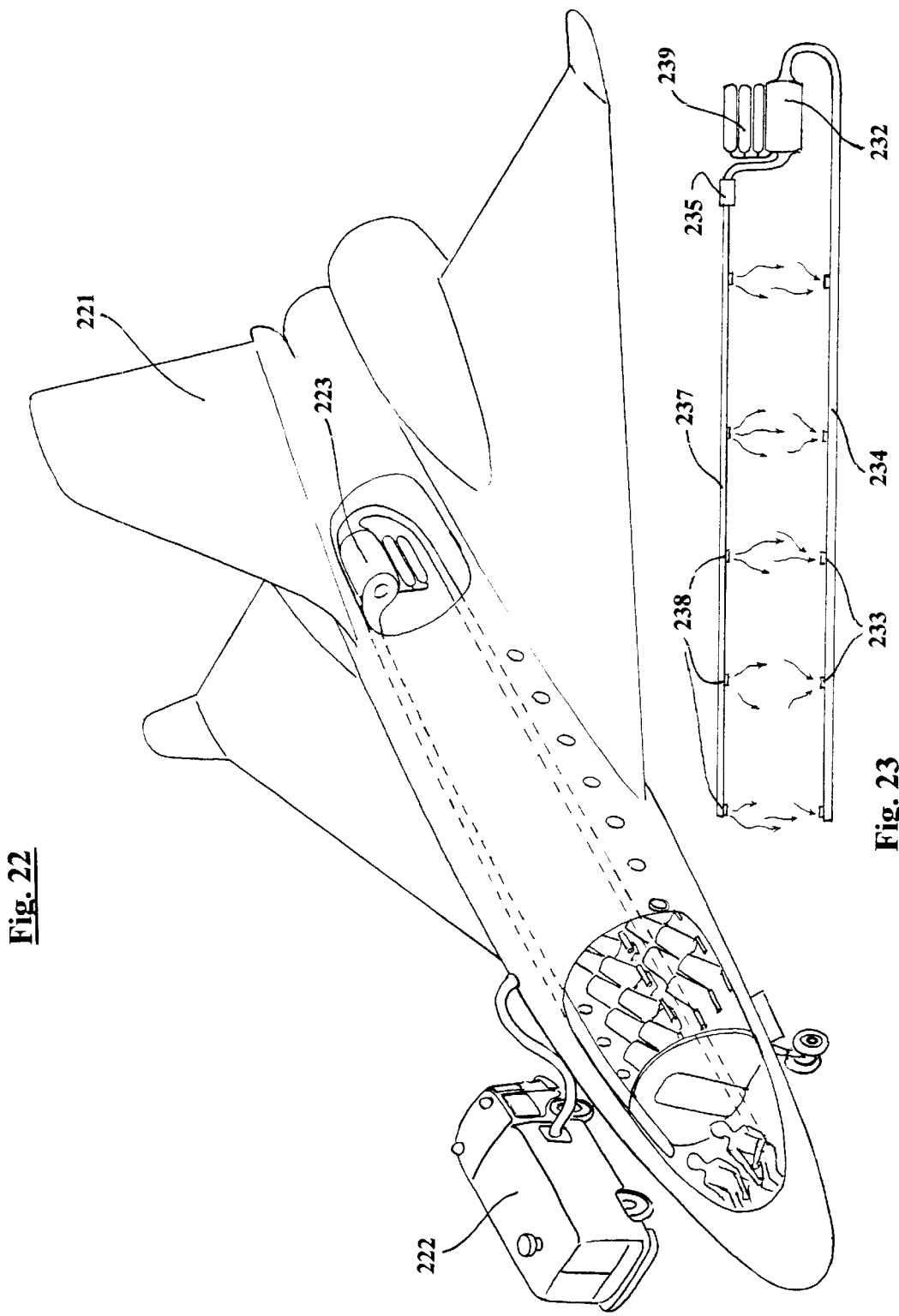

R - oxyhemoglobin saturation during exposure to 10% O2

S - oxyhemoglobin saturation during exposure to 10% O2 with 4% CO2 in the inspired air.

HYPOXIC FIRE PREVENTION AND FIRE SUPPRESSION SYSTEMS WITH BREATHABLE FIRE EXTINGUISHING COMPOSITIONS FOR HUMAN OCCUPIED ENVIRONMENTS

This application is a continuation in part of U.S. Ser. No. 09/551,026 "Hypoxic Fire Prevention and Fire Suppression Systems for computer rooms and other human occupied facilities", filed Apr. 17, 2000, U.S. Ser. No. 09/566,506 "Fire Prevention and Fire Suppression Systems for computer cabinets and fire-hazardous industrial containers", filed May 8, 2000 and of U.S. Ser. No. 09/750,801 filed Dec. 28, 2000 "Hypoxic Fire Prevention and Fire Suppression Systems and Breathable Fire Extinguishing Compositions for Human Occupied Environments".

This invention is related in part to preceding U.S. Pat. No. 5,799, 652 issued Sep. 1, 1998.

FIELD OF THE INVENTION

The present invention introduces the method, equipment, and composition of fire prevention and suppression systems that utilize a low-oxygen (hypoxic) environment to:

Instantly extinguish an ongoing fire

Prevent a fire from getting started.

With its mode of action based on the controlled release of breathable fire-suppressive gases, this human-friendly system is completely non-toxic, fully automated, and entirely self-sustaining. Consequently, it is ideally suited to provide complete fire protection to houses, industrial complexes, transportation tunnels, vehicles, archives, computer rooms and other enclosed environments.

With the majority of fires (both industrial, and non-industrial) occurring at locations with a substantial amount of electronic equipment, this Fire Prevention and Suppression System (FirePASS™) has the added benefit of requiring absolutely no water, foam or other damaging agent. It can therefore be fully deployed without causing harm to the complex electrical equipment (and its stored data) that is destroyed by traditional fire suppression systems.

While this is extremely important to technology-intensive businesses such as banks, insurance companies, communication companies, manufacturers, medical providers, and military installations; it takes on even greater significance when one considers the direct relationship between the presence of electronic equipment and the increased risk of fire.

DESCRIPTION OF PRIOR ART

Current fire suppression systems employ either water, chemicals agents, gaseous agents (such as Halon 1301, carbon dioxide, and heptafluoropropane) or a combination thereof. Virtually all of them are ozone depleting, toxic and environmentally unfriendly. Moreover, these systems can only be deployed post-combustion. Even the recent advent of the Fire Master 200 (FM 200) suppression system (available from Kidde-Fenwal Inc. in the U.S.A.) is still chemically dependant and only retards the progression of fire by several minutes. Once this fire-retarding gas is exhausted, a sprinkler system ensues that results in the permanent destruction of electronic equipment and other valuables.

Exposure to FM-200 and other fire-suppression agents is of less concern than exposure to the products of their decomposition, which for the most part are highly toxic and life threatening. Consequently, there is no fire suppression/extinguishing composition currently available that is both safe and effective.

In terms of train, ship, or airplane fires, the inability to quickly evacuate passengers creates an especially hazardous situation. The majority of the passengers who died in France's Mont Blanc tunnel fire suffocated within minutes. In this case the problem was further compounded by the presence of ventilations shafts. Originally designed to provide breathable air to trapped people, these shafts had the unfortunate side effect of dramatically accelerating the fire's propagation. Especially devastating is the "chimney effect" that occurs in sloped tunnels. An example of this was the fire that broke out in Kaprun's ski tunnel in Austrian Alps.

In addition, ventilation shafts (which are present in virtually all multilevel buildings and industrial facilities) significantly increase the risk of toxic inhalation. This problem is further compounded by the frequent presence of combustible materials that can dramatically accelerate a fire's propagation.

While the proliferation of remote sensors has led to significant breakthroughs in early fire-detection, improvements in the prevention/suppression of fires has been incremental at best. For example, the most advanced suppression system to combat tunnel fires is offered by Domenico Piatti (PCT IT 00/00125) at robogat@tin.it. Based on the rapid deployment of an automated vehicle (ROBOGAT), the Robogat travels to the fire site through the affected tunnel. Upon arrival it releases a limited supply of water and foam to initiate fire suppression. If necessary, the Robogat can insert a probe into the tunnel's internal water supply for continued fire-suppression. This system is severely limited for the following reasons:

The time that lapses between the outbreak of fire and the arrival of the Robogat is unacceptable.

The high temperatures that are characteristic of tunnel fires will cause deformation and destruction of the monorail, water and telecommunication lines.

The fire-resistance of the Robogat construction is highly suspected.

The use of water and foam in high-temperature tunnel fires is only partially effective and will lead to the development of highly toxic vapors that increase the mortality of entrapped people.

One of the main safety deficiencies in modern passenger airplanes that still remains unresolved is a lack of proper firefighting and fire preventing equipment.

In fact, it is not the flames associated with onboard fire that kills most flight crews and passengers, but rather the smoke saturated with toxins such as benzene, sulfur dioxide, formaldehyde, hydrogen chloride, ammonia and hydrogen cyanide. Although these and other chemicals are lethal, most victims die from carbon monoxide. This color- and odorless gas produced in abundance during fires, especially in enclosed compartments with insufficient ventilation, is extremely lethal even in small concentrations of less than one percent.

Toxic combustion products released in an enclosed compartment such as an aircraft cabin with no readily available escape means are of major concern in the air transport industry. This concern is of particular importance for passenger aircraft, because of constantly growing airplane capacity and increasing number of passengers that may be exposed.

The proliferation of toxic chemicals in modern advanced materials results in a cabin design completely made of plastics, fabrics, wiring and linings that can be extremely dangerous when they are heated sufficiently to produce gases. Survival in a toxic environment like this is limited to only a few minutes. Statistical analysis for the last decades shows that about 70–80 percent of fire fatalities result from toxic smoke inhalation.

A modern passenger aircraft is fully saturated with electric and electronic equipment, interconnected by many miles of wires and cables. Emergencies of various origins can lead to electric short-circuits with consequent inflammation of the insulating coat and surrounding flammable materials. This is followed by a massive production of toxic aerosols, which pose the main hazard, according to human fire fatality experience.

While the most important survival systems for aircraft, such as gas turbines and fuel tanks are sufficiently equipped with automatic fire-fighting systems, the passenger cabin and cockpit critically lack fire-preventive means. The use of standard fire-extinguishing substances, like Halon 2000 or the like, cannot resolve the problem, because of the high toxicity of the products of their pyrolysis. U.S. Pat. No. 4,726,426 (Miller) teaches such methods of fire extinguishing in an aircraft cabin as using ventilation ducts from the cargo fire extinguishing system, which would expose passengers to potentially lethal combinations of smoke, fire suppressants and highly toxic products of their pyrolysis.

In case of fire on board, pilots must complete an emergency checklist in order to localize the fire's origin. A pilot's emergency checklist is too long to let the crew control fires in the air. For the crew of the Swissair 111 that crashed near Nova Scotia in 1998, killing 299 people, it took 20 minutes after the first report of smoke untill the crash, while the standard checklist requires 30 minutes to complete.

It is supposed that oxygen masks would save passengers and flight crews from toxic inhalations. In reality airline pilots are instructed not to release the masks when the risk of an oxygen-fed fire would exacerbate the situation. Moreover, these masks are practically useless against combustions poisonous gases. Standard oxygen masks for flight crews and passengers have openings in them to mix the cabin air with the oxygen supply, thereby allowing a direct route for lethal gases to reach the lungs. Furthermore, the oxygen supply in a passenger aircraft provides less than 20% of the oxygen flow required for respiration and lasts for only a few minutes.

Alternatively, increasing the fresh air supply, as offered in ECHO Air system of Indoor Air Technologies Inc. in Canada, will only propagate a fire and accelerate its lethality. Their patent application provided on www.indoorair.ca teaches that an improved air ventilation system will allow the removal of contaminated air and supply fresh air into an aircraft cabin more efficiently. Claiming an improvement on fire safety, this method in practice improves the oxygenation of a fire source.

A recent study of the US Air Line Pilots Association (ALPA) suggests that in the year 1999, on average, one US airliner a day made an emergency landing because of a short circuit, which led to sparking, with resulting smoke and fire in the pressurized cabin. Faulty wiring is the leading culprit.

Some organizations have taken drastic action to deal with the problem. In 1987, the US Navy ordered the removal of the most vulnerable wiring from its planes, and in 1999 NASA grounded its entire fleet of space shuttles when a wiring fault led to a launch being aborted. Yet every day, millions of passengers are still carried by commercial aircraft that are equipped with old wiring that cannot be properly tested for faults. In the US, the Federal Aviation Administration (FAA) has been mounting a probe into the problems that may afflict aircraft that have been flying for more than 20 years. The Aging Aircraft Program has been running since 1988, prompted by an accident in which part of the roof peeled off an aging Boeing 737 in the sky over Hawaii. In 1996, TWA flight 800 came down off the coast of Long Island, killing all 230 people on board. Faulty wires inside a fuel tank were blamed as the most likely cause of the explosion. In the wake of that crash, checks on other airlines around the world led to the discovery of several other airplanes in which the insulation on aging wiring leading to sensors in fuel tanks had rubbed away through vibrations, or had been damaged during routine maintenance.

There are only 4 current methods of fire suppression in human-occupied facilities:

The use of water

The use of foam

The use of chemical flame inhibitors

The use of gaseous flame inhibitors

The present invention employs a radically different approach: the use of hypoxic breathable air for the prevention and suppression of fire. This hypoxic environment completely eliminates the ignition and combustion of all flammable materials. Moreover, it is completely safe for human breathing (clinical studies have proven that long term exposure to a hypoxic environment has significant health benefits). Hypoxic breathable air can be inexpensively produced in the necessary amount through the extraction of oxygen from ambient air.

In terms of fire prevention, a constantly maintained hypoxic environment can completely eliminate the possibility of fire while simultaneously providing an extremely healthy environment. In terms of suppression, this invention can instantly turn a normoxic environment into a hypoxic environment with absolutely no adverse effects to human life. This is extremely useful in the case of a flash fires or explosions.

Based on the exploitation of the fundamental differences between human physiology and the chemo-physical properties of combustion, this entirely new approach completely resolves the inherent contradiction between fire prevention and providing a safe breathable environment for human beings. Consequently, this invention is a radical advance in the management of fire and will make all current chemical systems obsolete Hypoxic Fire Prevention and Suppression Systems will completely prevent the massive socioeconomic losses that result from the outbreak of fire.

SUMMARY OF THE INVENTION

The principal objects of this invention are as follows:

The provision of a breathable fire-extinguishing composition

A method for producing a fire preventive, hypoxic atmosphere inside human-occupied environments.

The provision of oxygen-depletion equipment that produces breathable, hypoxic air with fire-extinguishing properties. Such equipment employs the processes of molecular-sieve adsorption, membrane-separation and other oxygen extraction technologies.

The provision of breathable fire-extinguishing compositions for continuous or episodic use in human occupied environments.

The provision of the equipment and the method to instantly produce a fire-suppressive, oxygen-depleted atmosphere, where people can safely breath (without respiratory-support means). This can be accomplished by releasing a hypoxic fire suppression agent and creating fire-suppressive atmosphere having an oxygen content ranging from 10% to 17%.

The provision of a method for producing a fire-preventive atmosphere in hermetically sealed objects with controlled temperature and humidity levels. This can be accomplished by introducing inert ballast into artificial atmosphere and changing the initial settings of current life-support systems and reprogramming them.

The provision of hypoxic fire preventive/suppressive environments inside tunnels, vehicles, private homes (separate rooms or entire structures), public/industrial facilities and all other applications for non-hermetic human occupied environments.

The provision of a fire suppression system that instantly releases stored oxygen-depleted gas mixture from a high-pressure pneumatic system or an autonomous container.

The provision of a method and ability to localize a fire site through the use of drop curtains, doors or other means of physical separation; with the subsequent release of breathable, fire-suppressive gas mixtures.

The provision of an aircraft fire suppression system utilizing a hypoxic fire suppression agent for producing a breathable atmosphere onboard having fire-extinguishing properties.

The provision of an aircraft fire suppression system having a flexible inflatable container for storage of the hypoxic fire suppression agent.

BRIEF DESCRIPTION OF THE DRAWINGS

FIG. 22 presents the implementation of the FirePASS in the next generation of airliners that can fly above the Earth's atmosphere (or for space vehicles).

FIG. 23 illustrates the general working principle of the autonomous air-regeneration system for hermetic human-occupied spaces.

DESCRIPTION OF THE INVENTION

This invention is based on a discovery made during research conducted in a Hypoxic Room System manufactured by Hypoxico Inc. The inventor discovered that that the processes of ignition and combustion in a normbaric, hypoxic environment are far different from the ignition and combustion process that occurs in a hypobaric or natural altitude environment with the same partial pressure of oxygen.

For example, air with a 4.51" (114.5 mm of mercury) partial pressure of oxygen at an altitude of 9,000' (2700 m) can easily support the burning of a candle or the ignition of paper.

However, if we create a corresponding normbaric environment with the same partial pressure of oxygen (4.51" or 114.5 mm of mercury), a candle will not burn and paper will not ignite. Even a match will be instantly extinguished after the depletion of the oxygen-carrying chemicals found at its tip. For that matter, any fire that is introduced into this normbaric, hypoxic environment is instantly extinguished. Even a propane gas lighter or a gas torch will not ignite in this environment This surprising observation leads to an obvious question: "Why do two environments that contain identical partial pressures of oxygen (identical number of oxygen molecules per specific volume) effect the processes of ignition and combustion so differently?""

The answer is simple: "The difference in oxygen concentration in these two environments diminishes the availability of oxygen to support combustion. This is due to nitrogen molecules interfering with the kinetic properties of oxygen molecules". In other words, the increased density of nitrogen molecules provides a "buffer zone" that obstructs the availability of oxygen.

Figure 1:
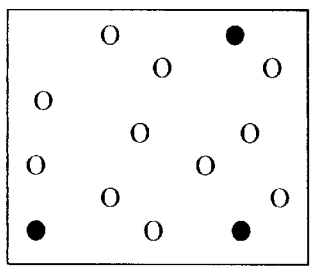
FIG. 1 presents a schematic view of the density of oxygen and nitrogen molecules in a hypobaric or natural altitude environment.

FIG. 1 presents a schematic view of the density of oxygen and nitrogen molecules in a hypobaric or natural environment at an altitude of 9,000'/2.7 km. (All other atmospheric gases are disregarded in order to simplify the following explanations). Dark circles represent oxygen molecules, and hollow circles represent nitrogen molecules.

Figure 2:
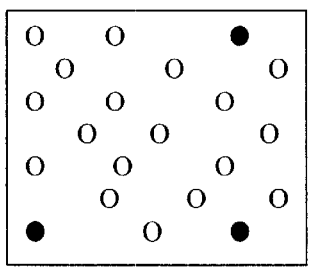
FIG. 2 presents a schematic view of the density of oxygen and nitrogen molecules in a normbaric hypoxic environment with the same partial pressure of oxygen.

FIG. 2 shows the density of molecules in a hypoxic environment with the same partial pressure of oxygen (4.51" or 114.5 mm of mercury), but at a standard atmospheric pressure of 760 mm of mercury.

As can be seen, both environments contain identical amounts of oxygen molecules per specific volume. However, in the second case (shown on FIG. 2) the relative amount of nitrogen molecules versus oxygen molecules is approximately 6:1 to 4:1, respectively.

When the kinetic properties of both gases are compared it is discovered that nitrogen molecules are both slower and less permeable (by a factor of 2.5) than oxygen molecules. This relative increase in the number of inert nitrogen molecules obstructs the kinetic behavior of oxygen molecules. This reduces their ability to support ignition and combustion.

Figure 3:
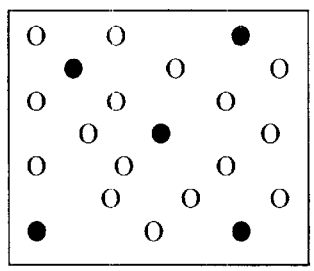
FIG. 3 presents a schematic view of the density of oxygen and nitrogen molecules in a normbaric normoxic environment; or in ambient air at sea level.

FIG. 3 shows that at sea level, the oxygen/nitrogen composition in ambient air has a greater partial pressure (159.16 mm of mercury) of oxygen than air found at 9,000' (114.5 mm). It should be noted that ambient air in any portion of the Earth's atmosphere (from sea level to mount Everest) has an oxygen concentration of 20.94%. However, the ambient air found at sea level is under substantially more pressure: Therefore the number of gas molecules per specific volume increases as the distance between the gas molecules is reduced.

"Hypoxic Threshold" and its Physiological Background

During the last decade a substantial amount of data has been accumulated on the physiological effects of hypoxic environments. Extensive laboratory experimentation along with in-depth clinical research has established clear benefits of normbaric, hypoxic air in fitness training, and disease-prevention. Oxygen concentrations in normbaric breathing air at altitudes up to 2600 m) with the corresponding partial pressure of oxygen have absolutely no harmful side effects on the human body. (Peacock 1998).

This elevation is inhabited by millions of people throughout the world, with no detrimental health effects (Hochachka 1998).

Analysis of data derived from numerous experiments by the inventor has led to the conclusion that under normbaric conditions it is possible to create an artificial environment with breathable hypoxic air that can simultaneously suppress ignition and combustion Multiple experiments were conducted focusing on ignition suppression and flame extinction in a normbaric environment of hypoxic, breathable air. It was found that the ignition of common combustible materials was impossible once the oxygen content dropped below 16.8%. During combustion tests, diffuse flames of various tested materials were completely extinguished when oxygen content fell below 16.2%.

This discovery justifies the creation a new scientific term: "Hypoxic Threshold" which represents the absolute flammability limits of any fuel in an artificial atmosphere with oxygen content of 16.2%. Flame extinction at the Hypoxic Threshold results in the instant elimination of combustion; including an accelerated suppression of glowing. This results in the continued suppression of toxic fumes and aerosols.

These experiments unequivocally prove that a breathable, human-friendly environment, with oxygen content under 16.2%, will completely suppress ignition and combustion.

In terms of partial pressure of oxygen, the Hypoxic Threshold (16.2% O2) corresponds to an altitude of 2200 meters. This is identical to the altitude that is used to pressurize passenger aircraft during routine flights. It has been proven to be completely safe, even for people with chronic diseases such as cardiopulmonary insufficiency (Peacock 1998).

A normbaric environment at Hypoxic Threshold provides a fire-preventive atmosphere that is completely safe for private dwellings, or the workplace. It is scientifically proven that the physiological effects of mild normbaric hypoxia are identical to the effects exhibited at the corresponding natural altitude. Millions of people vacation at these altitudes (2 to 3 km) with no harmful side effects The schematic diagram provided in FIG. 8 contrasts the differing reactions of two oxygen-dependent systems (a flame and a human body) when exposed to a hypoxic environment.

Curve Y represents the decline in combustion intensity (corresponding to the height of a stabile diffusion flame) in relation to the declining oxygen content in a controlled environment. 100% corresponds to the maximum height of a flame at an ambient atmospheric oxygen content of 20.94%. When oxygen content in the controlled atmosphere drops below 18%, a sharp decline in flame height can be observed. At hypoxic threshold X (16.2% O2) the flame and its associated glowing are completely extinguished.

In terms of prevention, the Hypoxic Threshold can be set at 16.8%. This is due to the fact that a diffuse flame receives supplemental oxygen through a combination of convection and free radical production from decomposing fuel—the factors that are not present until post-ignition. However, in order to insure maximum protection each future embodiment will require an environment with oxygen content at or below the "Hypoxic Threshold" (16.2%).

Curve Z illustrates the variance of hemoglobin's oxygen saturation with as it relates to the partial pressure of inspired oxygen. In ambient air (at sea level), average hemoglobin saturation in vivo is 98%. At dynamic equilibrium molecules of oxygen are binding to heme (the active, oxygen-carrying part of hemoglobin molecule) at the same rate oxygen molecules are being released. When the PO2 (partial pressure of oxygen) is increased, the rate that oxygen molecules bind to hemoglobin exceeds the rate at which they are released. When the PO2 decreases, oxygen molecules are released from hemoglobin at a rate that exceeds the rate at which they are bound.

Under normal thermal conditions, the saturation of hemoglobin remains above 90%, even if exposed to an alveolar PO2 of 60 mm Hg (which corresponds to an altitude of 3300 meters or 14% O2 in normbaric hypoxic air). This means that oxygen transport will continue at an acceptable rate despite a significant decrease in the oxygen content of alveolar air.

It is important to note that a partial pressure of the inspired oxygen can only determine the hemoglobin saturation in the alveoli. All the following oxygen transport and metabolism depend only from the balance between the body's cellular demand and the body's vascular delivery capacity. In standard atmospheric conditions the partial pressure of neutral diluting gases has no influence on the metabolism and transport of oxygen.

In contrast, the ability of oxygen molecules to support combustion is substantially impinged as the relative concentration of neutral or inert gases (in this case-nitrogen) increases.

The radically different properties of these oxygen dependent systems is the crucial factor that allows a hypoxic environment at the Hypoxic Threshold to be completely safe for human life, but not support combustion.

Figure 8:
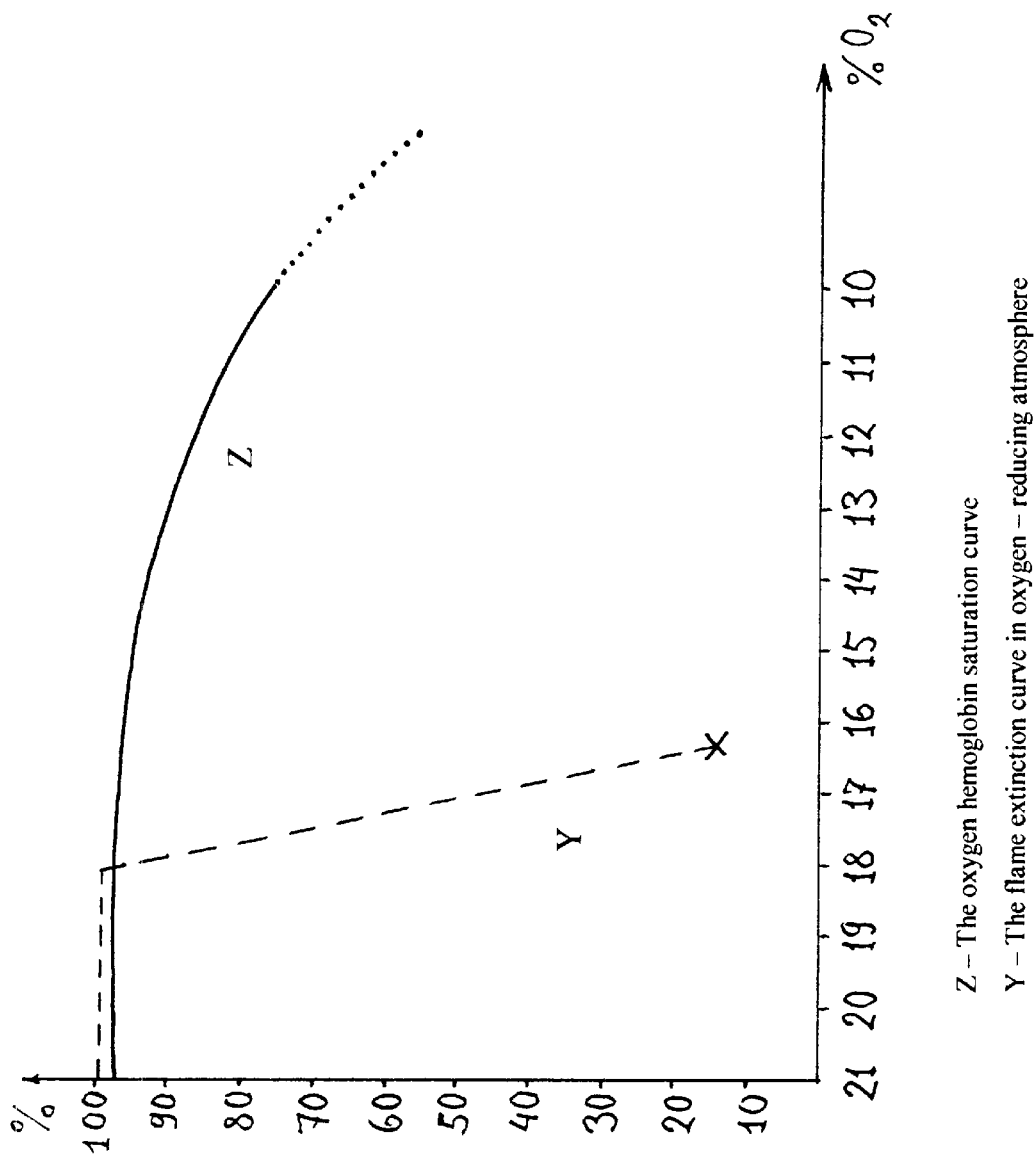
FIG. 8 illustrates the comparison of a flame extinction curve and a hemoglobin/oxygen saturation curve upon the introduction of reduced-oxygen air in a controlled environment.

The diagram presented in FIG. 8 clearly illustrates that the Hypoxic Threshold does not significantly alter the saturation of hemoglobin in vivo. Conversely, the Hypoxic Threshold instantly extinguishes any flame. It should be noted that curve Z represents the hemoglobin saturation curve of an individual who is exposed to hypoxia without previous adaptation. In cases where a hypoxic environment is used proactively (for fire prevention), individuals quickly adapt to the reduced oxygen level and will have normal hemoglobin saturation levels.

Consequently, there is absolutely no risk to people who spend an extended period of time in a hypoxic environment. In fact numerous medical publications describe the significant health benefits associated with long-term exposure to normbaric hypoxia. More information on these studies can be found at Hypoxico Inc's website (www.hypoxico.com).

In addition, further studies indicate that high levels of humidity enhance the capability of a hypoxic environment to suppress combustion. This is due to the fact that fast moving water molecules create a secondary buffer zone that makes oxygen molecules less available to support ignition or combustion.

Figure 4:
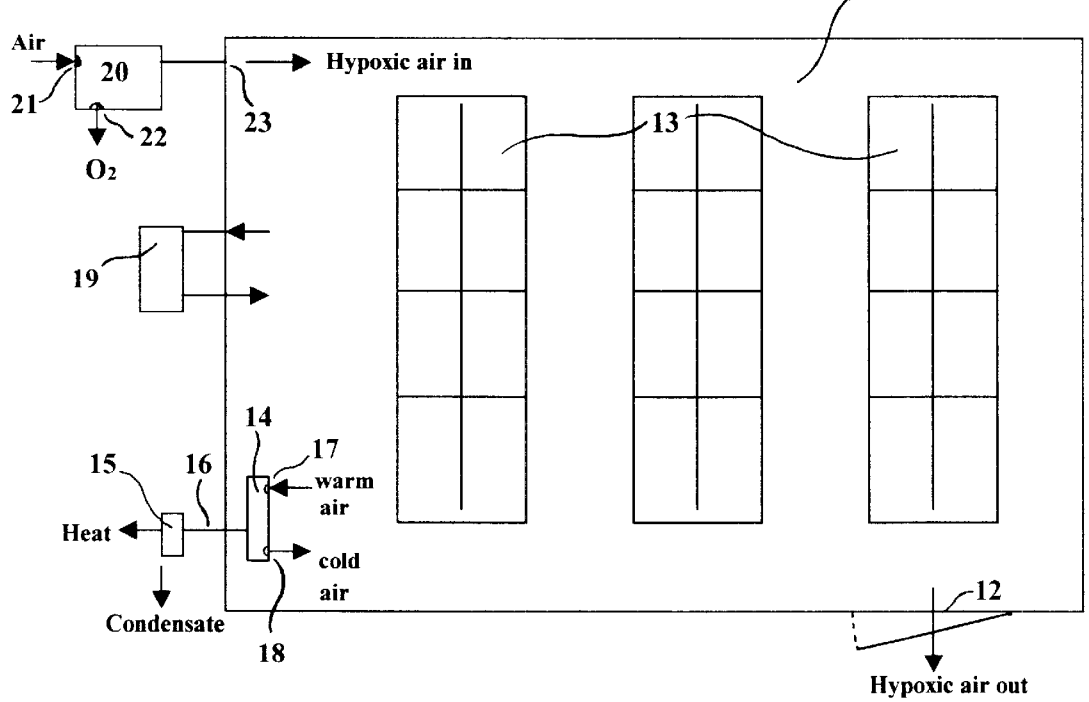
FIG. 4 illustrates schematically a working principle of normbaric hypoxic fire prevention and suppression system.

FIG. 4 shows a schematic view of a basic concept of a fire protected normbaric (or slightly hyperbaric) human-occupied space 11 for living or working FIG. 4 illustrates a particular case of a room 11 having racks of electronic equipment 13 (or stored flammable materials) located in a normbaric environment with oxygen concentration at or below the Hypoxic Threshold. This environment provides absolute fire safety by:

Preventing combustible materials from igniting

Instantly suppressing electrical or chemical fires.

Hypoxic environments with an oxygen content of 17% to 18% can also provide limited protection against ignition and combustion. However, it is advisable for public areas (e.g. museums, archives etc.) to maintain an oxygen concentration at a level from 15% to 16.8%. For human occupied public facilities that require superior fire protection an oxygen content of 14% to 15% is recommended. Facilities that require only short periodical human visits may employ environments with oxygen content ranging from 12% to 14%. This corresponds to an altitude of 3 km to 4.5 km (10,000' t 14,500').

The hypoxic air inside the computer room 11 is maintained at approximately 67° F. (18° C.) by a split air-conditioning unit (14) and is connected to an external heat exchanger (15) by a hose 16. Warm air enters the unit 14 through an intake 17, gets chilled, and then exits the unit 14 through an outlet 18. Hot refrigerant and water condensation (from air) are transmitted through a connector hose 16 into an external unit 15. At this point the refrigerant gets chilled, and the condensation is either evaporated or removed. The working principle of a split a/c unit is well known and shall not be described in this patent. A suitable device—PAC/GSR is made by the Italian company DeLonghi. Larger split a/c systems are also readily available. For facilities that do not contain computer equipment air conditioning is not required A Hypoxic generator 20 is installed outside a room 11. The generator 20 takes in ambient air through an intake 21 and extracts oxygen. Oxygen-enriched air is then disposed of through outlet 22. The remaining hypoxic gas mixture is transmitted inside the room 11 through the supply outlet 23. Excessive hypoxic air leaves the room 11 through a door 12 in order to equalize the atmospheric pressure inside the room 11 with the outside environment.

The door 12 for personnel entry is not airtight—allowing excess air to the exit room 11. For a 20 cubic meter room, a gap of approximately 5 mm is sufficient for immediate pressure equalization. For some applications it is beneficial to create a slightly hyperbaric environment. This can be easily accomplished by making the room 11 airtight and eliminating gaps around the door 12. Other possibilities are described in previous U.S. Pat. Nos. 5,799.652 and 5,887.439.

The number of hypoxic generators needed for a room 11 depends on a combination of its size and the number of people that occupy it. The generator best suited for a 20-m3 room would be the HYP-100/F. This is currently available from Hypoxico Inc. of New York. The HYP-100/F employs a PSA (pressure-swing adsorption) technology that extracts oxygen from ambient air. This maintenance free unit weighs only 55 lbs (25 kg) and requires only 450 W. A nitrogen generator with the same capability would be 3 times heavier and would consume 2–3 times more power. An additional advantage of the hypoxic generator is its ability to increase the humidity of hypoxic air. To avoid accidents, the oxygen concentration setting cannot be changed by the user.

Figure 5:
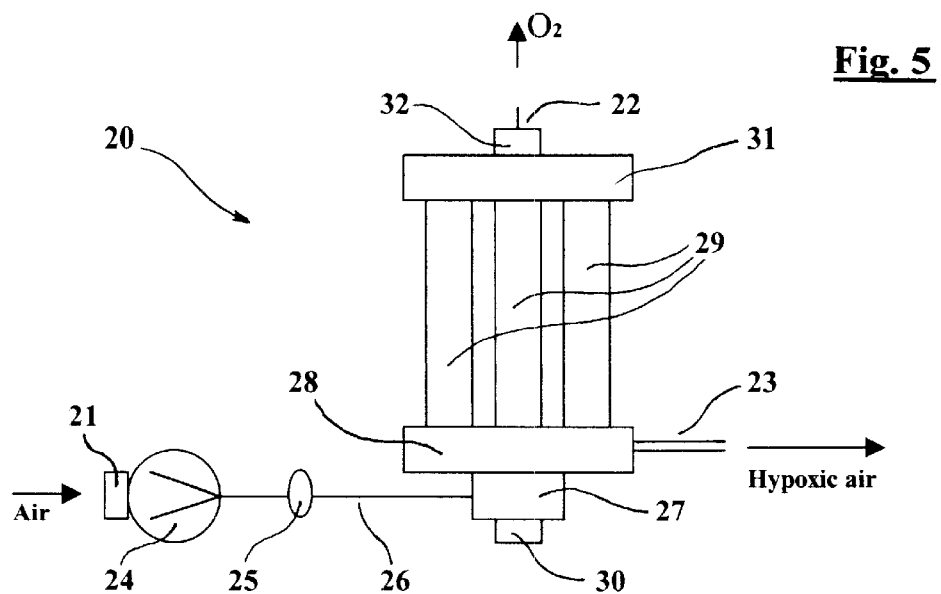
FIG. 5 presents a schematic view of the working principle of hypoxic generator HYP-100/F.

FIG. 5 illustrates the working principle of hypoxic generator 20. The compressor 24 takes in ambient air through an intake filter 21 and pressurizes it up to 18 psi. Compressed air is then chilled in a cooler 25 and is transmitted through a conduit 26 into a distribution valve 27. This is connected to multiple separation containers or molecular sieve beds 29 via a manifold 28. Depending on design needs, these can be installed in a linear or circular fashion. The number of molecular sieve beds may vary from one to 12. HYP-100/F is designed with 12 molecular sieve beds in a circular formation, pressurized in 3 cycles, four beds at a time. This is accomplished by a rotary distribution valve 27. In this particular case a small electric actuator motor 30 drives a rotary valve 27. Both the design, and the working principle of rotary distribution valves, motors and actuators are well known and will not be described further. All of these parts are widely available from valve distributors.

Each molecular sieve bed 29 (or group of beds in case of HYP-100/F) gets pressurized in cycles via a valve 27 that selectively redirects compressed air into each bed. These beds 29 are filled with molecular sieve material (preferably zeolites) that allow oxygen to pass through while adsorbing most other gases; including water vapors (this is important for the end product). Oxygen (or the oxygen-enriched fraction) passing through the zeolites is collected in collector 31 and is released through a release valve 32. It is then disposed into the atmosphere through an outlet 22.

When the zeolites in one of the beds 29 become saturated with oxygen depleted air, the compressed air supply is blocked by a valve 27. This bed then depressurizes, allowing oxygen-depleted air to escape from the zeolites in the bed 29. It is then transmitted through a manifold 28 into a hypoxic air supply conduit 23. This one-way release valve 32 keeps the oxygen-enriched fraction in the collector 31 under minimal pressure (approximately 5 psi). This assures that during the depressurization of the bed 29 sufficient oxygen can reenter. This purges the zeolites that are contaminated with nitrogen and water, thereby enhancing their absorption capacity.

A motorized rotary actuator 30 may be replaced with a linear actuator with a mechanical air distribution valve 27. The motorized actuator 30 may also be replaced by a set of solenoid, or electrically operated air valves 27. However, this will require the addition of a circuit board, making the generator 20 more costly and less reliable. Solenoid valves, mechanical valves, electric valves and linear actuators are widely available and will not be described further.

Figure 6:
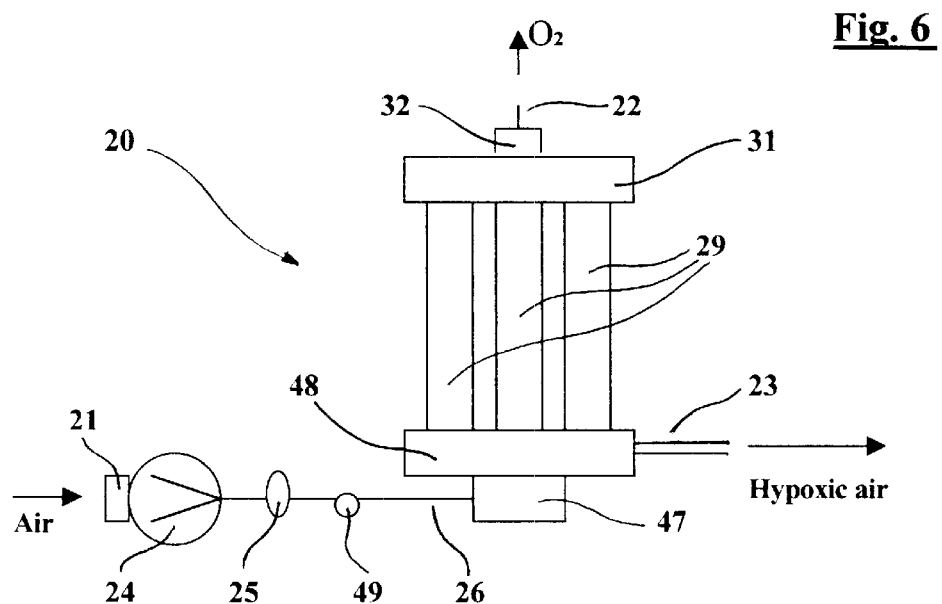
FIG. 6 provides future modification of the same generator shown on FIG. 5.

FIG. 6 shows a hypoxic generator 40, which is available from Hypoxico Inc. This model works on compressed air provided by a compressor 24 and does not require additional electric motors, switches or circuit boards. In this case the distribution valve 47 is comprised of one or more air-piloted valves mounted on a manifold 48. Air-piloted valves are driven by compressed air and do not require additional support. The compressed is cleaned by a long-life HEPA filter 49 available from Hypoxico Inc. Suitable air-piloted valves are available from Humphrey Products in Kalamazoo, Mich., U.S.A. Numerous combinations can be employed in distribution valve 47 in order to distribute compressed air in a cyclical manner. A suitable valve can be selected from this group, which includes electrical, mechanical, air piloted, or solenoid valves. Both linear and rotary configurations are available with actuators controlled by pressure, mechanical springs, motors or timers. It is not possible to cover all potential air distribution solutions in this patent. The number of molecular sieve beds in this model may vary from 1 to 12 (or more).

HYP-100/F provides hypoxic air with 15% oxygen at the rate of 100 liters per minute different settings from 10% to 18% are available and must be preset at the factory). The HYP-100/F is tamper resistant, as an unauthorized individual cannot change the oxygen setting. Larger size generators up to 1200 L/min are also available from Hypoxico Inc.

The hypoxic generator 20 supplies hypoxic air with approximately 15% greater humidity than the surrounding ambient air. In mild climates, this increased level humidity along with the appropriate temperature provides a perfect environment for computers. In drier climates, or when a nitrogen generator is used in place of a hypoxic generator 20, it is advisable to install a humidifier 19 (optional in other cases) to maintain the room at approximately 40% relative humidity. Any humidifier that is certified for public use is acceptable.

Multiple generators 20 can be placed in a special generator room with its own a/c system and a fresh air supply above 500 ft$^3$/h (14 m$^3$/hour) per each HYP-100/F generator. This is convenient for larger facilities with multiple rooms 11. In this case, larger air-conditioning units working in the recycle mode should be installed. Hypoxic generators will provide sufficient ventilation and fresh air supply. Every hypoxic generator is equipped with a HEPA (high efficiency particulate arrestance) filter that provides almost sterile air. In addition this "clean environment" is also beneficial for fire prevention as they substantially reduce dust accumulations on computer equipment.

Room 11 may also represent a computer cabinet 13. In this case, hypoxic air supplied by a miniature size generator 20 is chilled by a small heat exchange module 14 (both will be available from Hypoxico Inc.).

Any oxygen extraction device, such as a nitrogen generator or an oxygen concentrator can be used instead of a hypoxic generator 20. However, this will create significant disadvantages. PSA (pressure-swing adsorption) and membrane separation nitrogen generators require much higher pressures. The result of this is a less power efficient unit that is heavier, noisier, and costlier to maintain. Moreover, nitrogen generators are inefficient and create an extremely arid product that would require extensive humidification. Other oxygen extraction technologies, such as temperature-swing or electrical current swing absorption, may also be employed in the oxygen extraction device 20. Most of these technologies rely on the use of an air pump and an air separation module. The design and working principle of such air separation modules (employing both molecular-sieve adsorption and membrane separation technologies) is well known and widely available.

Figure 7:
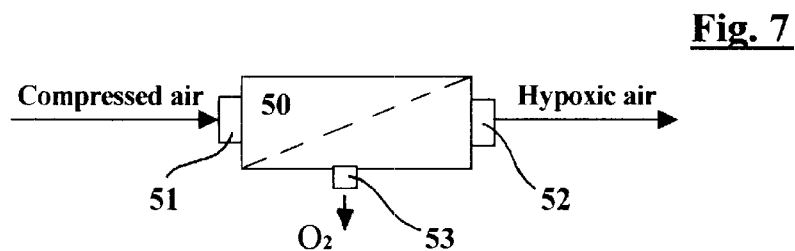
FIG. 7 illustrates a working principle of a membrane separation module.

FIG. 7 shows a schematic view of a nitrogen generator or oxygen concentrator employing an oxygen-enrichment membrane module 50. Extracted oxygen is disposed of through an outlet 53. Dry compressed air is delivered via an inlet 51 into a hollow-fiber membrane module 50. Fast moving oxygen molecules under pressure diffuse through the walls of hollow fibers and exit through the outlet 53. Dry nitrogen or a nitrogen enriched gas mixture passes through the hollow fibers and is transmitted through an outlet 52 into the room 11. The employment of this technology in the Hypoxic FirePASS system would require additional humidification of the room's 11 environment Both, nitrogen generators and oxygen concentrators require sophisticated computerized monitoring equipment to control and monitor oxygen levels. This makes them unsafe for human occupied facilities.

The principle of a normbaric hypoxic environment for fire prevention and suppression could be applied to any room. Enclosures of any shape and size including buildings, marine vessels, cargo containers, airliners, space vehicles/space station, computer rooms, private homes, and most other industrial and non-industrial facilities will benefit from a fire-preventative hypoxic environment.

In a large computer facility, each rack with computer equipment 13 may be enclosed in its own hypoxic room 11. This energy sparing strategy will provide a normoxic environment between the racks 13. In addition, it will not interfere with a facility's current fire suppression system. Moreover, the facility may use a much cheaper sprinkler system, as water will not be able to damage computer equipment that is enclosed inside the hypoxic room's watertight panel enclosures. Hypoxico Inc. in New York manufactures suitable modular panel enclosures of any size. In this case, air-conditioning for each enclosure becomes optional as the facility might already be sufficiently chilled.

FIG. 8 illustrates a comparison of flame extinction curve Y and hemoglobin saturation curve Z in a controlled atmosphere during the gradual reduction of oxygen (This has been explained earlier).

Figure 9:
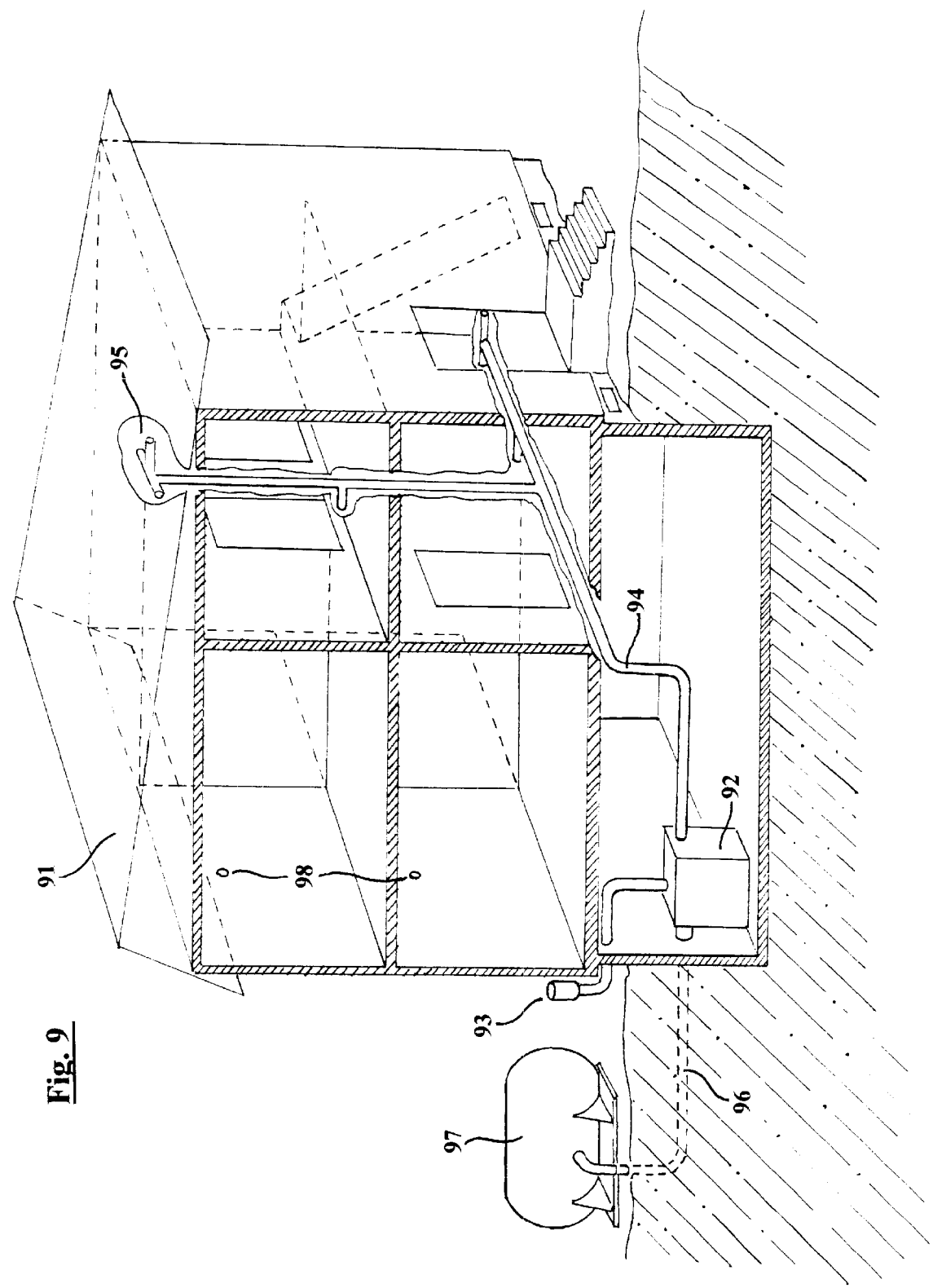
FIG. 9 shows a schematic view of the invented system for house dwellings.

FIG. 9 shows a schematic view of a private home with a dual mode modification of the FirePASS system. The system can be set in the preventative mode or the suppressive mode.

A house 91 having installed the Home FirePASS system will include a hypoxic generator 92 with an outside air intake 93 and distribution piping 94. Discharge nozzles 95 will be located in every room.

This type of hypoxic generator 92 incorporates an additional compressor (not shown) that allows hypoxic air to be stored and maintained in a high-pressure storage container 97, via pipe 96.

Hypoxic air used in fire-preventive mode should have oxygen content of approximately 16%. In the suppressive mode the oxygen content in the internal atmosphere (after the deployment of the FirePASS) should be between 12% and 14%.

Smoke and fire detectors 98 installed in the home will initiate the Home FirePASS in the suppressive mode (in the prevention mode fire ignition is impossible). All detection and control equipment is available on the market and will not be described further.

The storage container 97 can contain hypoxic air under a pressure of approximately 100 bar (or higher), when a smaller tank is desired. The container 97 should be installed outside of the home 91, preferably in protective housing. High-pressure gas storage containers and compressors are readily available in the market. The hypoxic generator 92 for the Home FirePASS is available from Hypoxico Inc.

The working principle of the system can be described as follows. The hypoxic generator 92 draws in fresh outside air the through the intake 93, and supplies hypoxic air into a high-pressure container 97 through a built-in compressor. Recommended storage pressure in the tank is approximately 100 bar.

The system has two operating modes: preventative mode and suppressing mode. When the home is left uninhabited (during working hours or vacations), a fire-preventive mode is initiated by pressing a button on the main control panel (not shown). This initiates the system by starting the hypoxic generator and allowing the slow release of hypoxic air from the container 97 into the distribution piping 94. Nozzles 95 are located in every room in the house. Consequently, a fire-preventive environment (with an oxygen content of 16%) can be established in approximately 15 minutes. In addition, a hypoxic environment can be created with an oxygen concentration below 10%. This is a very effective deterrent against intruders, as it is an extremely uncomfortable environment to be in. When people return home, they can quickly establish a normoxic atmosphere by opening windows or using a ventilating system (not shown). When the fire-preventive environment is created, the generator 92 will refill the container 97 with hypoxic air.

If desired, a hypoxic fire-preventive atmosphere can be permanently established, making the container 97 obsolete. In the preventive mode, the generator 92 of the Home FirePASS will constantly provide a human friendly normbaric hypoxic environment with oxygen content of 16%. This corresponds to an altitude of 2200 m above sea level. This breathable fire-preventive atmosphere provides a number of health benefits (described on www.hypoxico.com) and excludes the possibility of combustion (even smoking inside house 91 will be impossible). For cooking purposes, electric appliances must be used. Household heating appliances that run on gas or liquid fuel can be made operational by installing an air supply duct that allows outside air to be drawn for combustion.

The system's fire suppression mode is tied directly to smoke or thermal detectors 98, installed in each room of the house. A signal from a smoke detector 98 is transmitted to the main control panel, which opens an automatic release valve (not shown). This results in the rapid introduction of the hypoxic gas mixture from the container 97. Release nozzles 95 can be equipped with small air-powered sirens that are activated upon the release of hypoxic air. It is recommended that hypoxic gas should be released into all rooms simultaneously.

However, in order to reduce the size of container 97, the release of hypoxic air can be limited to the room in which smoke was detected. Given FirePASS's reaction time of less than one second, this should be more than sufficient to suppress a localized fire. More concentrated hypoxic fire suppression agent with oxygen content from 0.1% to 10% can be used as well, in order to reduce the size of the storage container 97. The exact size and amount of the fire suppression agent should be calculated so that when released, it creates a breathable fire-suppressive atmosphere having oxygen concentration from 10% to 16%.

To reduce costs, the Home FirePASS can operate in suppression mode without the installation of generator 92. In this case the system will consist of a high-pressure tank 97, gas delivery piping 94 and a detection and control system 98. A local service company can provide the requisite maintenance and refilling of the gas storage tanks 97.

Figure 10:
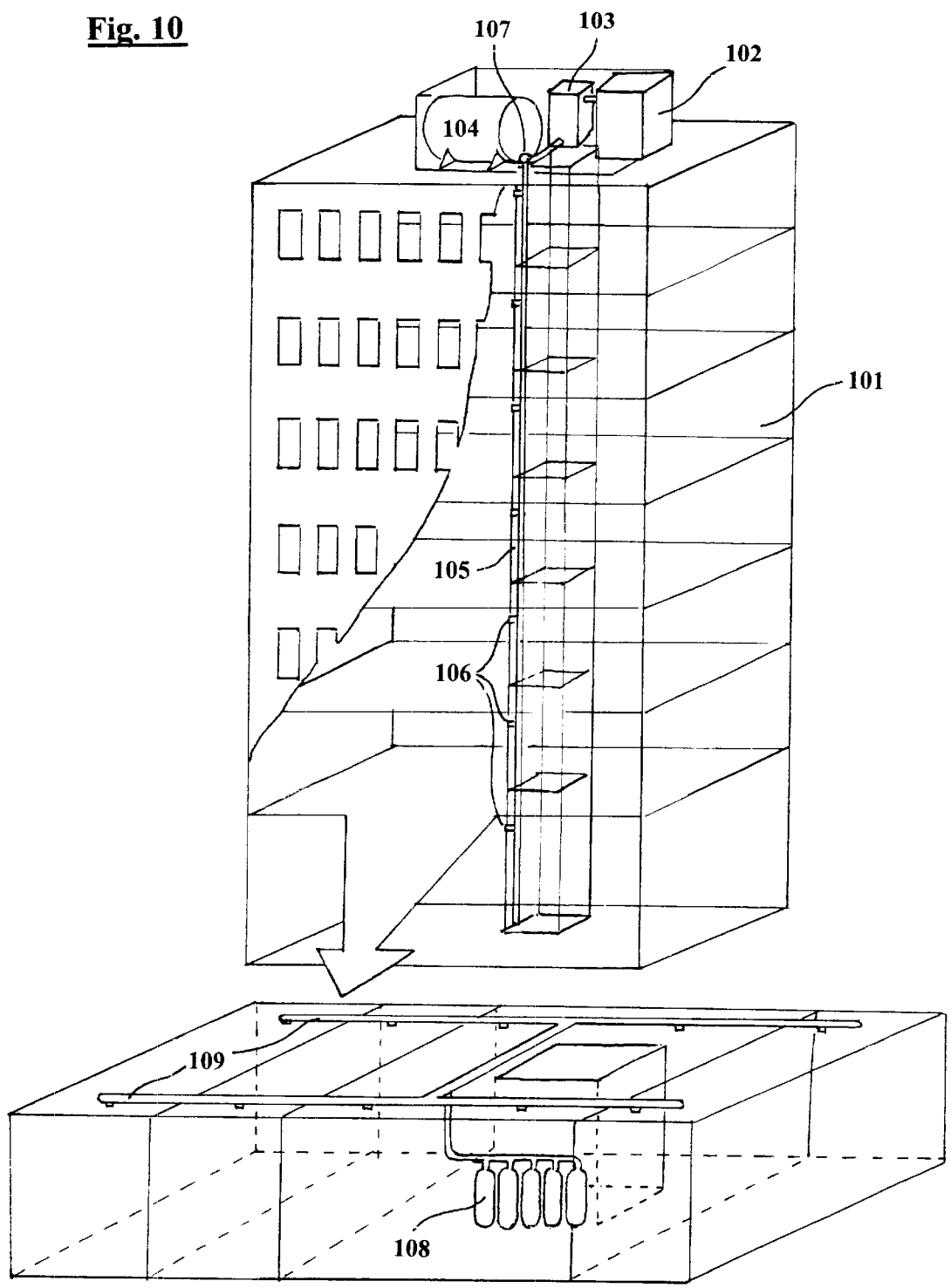
FIG. 10 presents a schematic view of the invented system for multilevel buildings.

FIG. 10 is a schematic view of a multilevel building 101 with the Building FirePASS installed in fire-suppressive mode.

A larger FirePASS block (available from Hypoxico inc.) installed on the roof of the building 101 has a hypoxic generator 102 providing hypoxic air (or fire extinguishing agent) through the extraction of oxygen from ambient air. The generator 102 communicates with a compressor 103, delivering hypoxic air at high pressure to the storage container 104. Once there, it is maintained under a constant pressure of approximately 200 bar (or higher).

As shown in FIG. 10, a vertical fire agent delivery pipe 105 having discharge nozzles 106 on each floor can be installed throughout the entire building, either externally or in an elevator shaft. Discharge nozzles 106 are installed with silencers to reduce the noise created by the release of high-pressure fire agent.

When fire is detected, a signal from a central control panel initiates the opening of a release valve 107 forcing stored hypoxic air (fire agent) into the distribution pipe 105. Given the FirePASS's rapid response time, the creation of a breathable fire-suppressive environment on the affected floor should be sufficient. However, as an added precaution, hypoxic agent should be released to the adjacent floors as well. The Building FirePASS will release sufficient amount of the hypoxic fire suppression agent (with oxygen content below 10%). to the desired floors creating a breathable fire-suppressive atmosphere with oxygen content of approximately 12%–15%

The positive pressure of the hypoxic atmosphere will guarantee its penetration into all apartments and will instantly suppress a source of fire in any room. In addition, by establishing a hypoxic environment on the adjacent floors, a fire will be unable to spread to the upper portion of the building. A key advantage of this system is that it can be incorporated into the fire-sensing/fire-extinguishing equipment that is currently in place (such as employed by a sprinkler system, gas-suppression system, etc.)

Separate floors may have an individual fire detection system connected to an individual Floor FirePASS, as shown on the bottom of FIG. 10. High-pressure hypoxic gas containers 108 can release hypoxic agent throughout the floor via distribution piping 109 with discharge nozzles in each room. In order to reduce the storage pressure and the size of container, a very low oxygen concentration may be used in the stored gas, provided that a safe breathable atmosphere will be established in each room with oxygen content of about 12%–15%. Freestanding fire-extinguishing units with hypoxic fire agent can be used in selected rooms in the building. Such units are described later in connection to FIG. 12.

The Building FirePASS shown on FIG. 10 can be installed in current buildings of any type. The same system without gas storage container 104 can work in the fire-preventive mode, constantly supplying hypoxic fire-retarding air for ventilation. In the future, most of buildings and structures for living, working or entertainment will have self-contained artificial atmospheres created and maintained using the invented FirePASS technology. Hypoxic generator 102 may employ pressure or temperature-swing absorbers, cryogenic air liquefiers with centrifugal separators, membrane separators, electric current or electric field separators and other oxygen-extraction technologies. Produced oxygen will be consumed by a building's power plant, fuel cells, etc., which will allow cleaner combustion and higher efficiency of the power generating systems.

Figure 11:
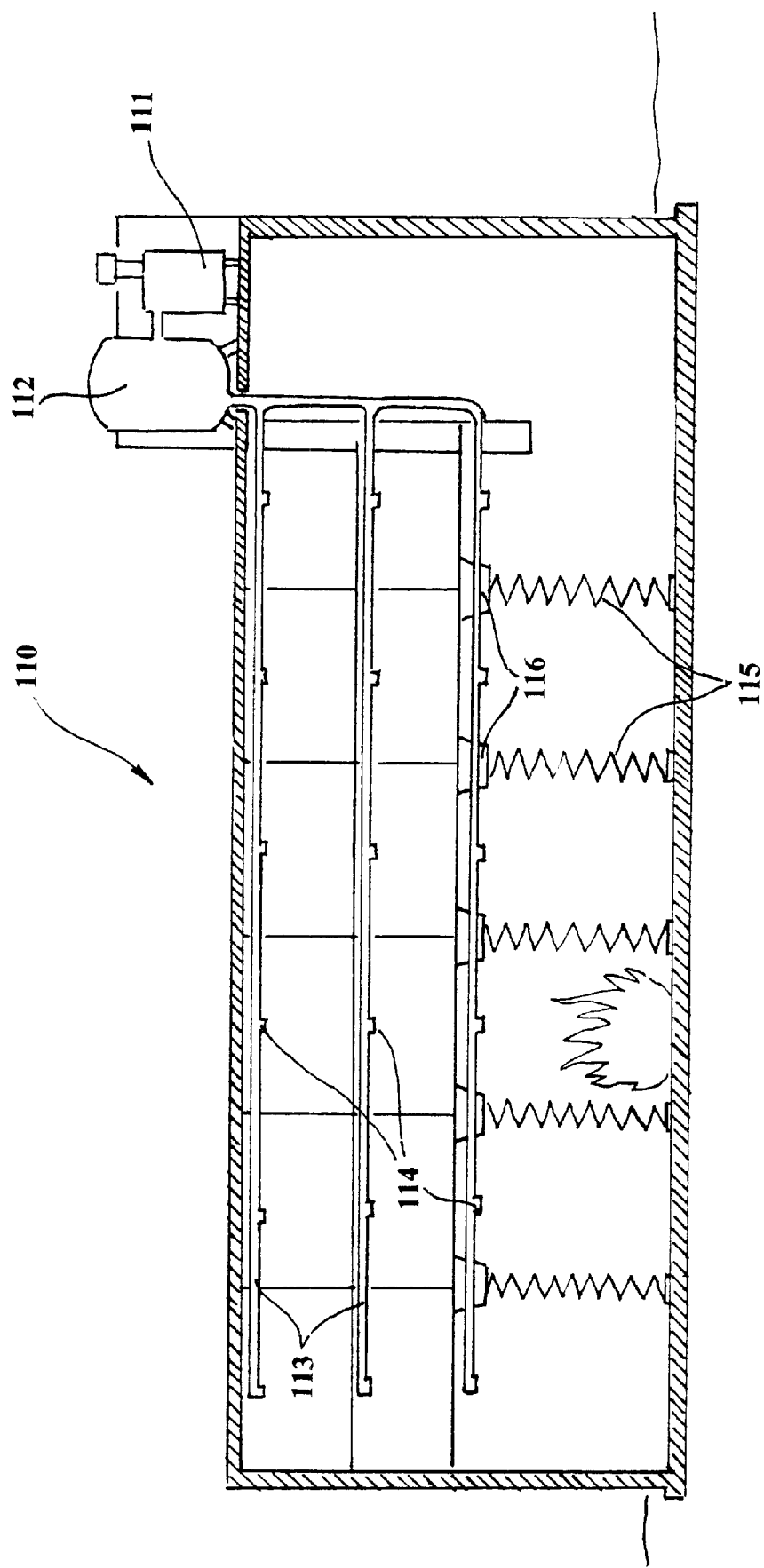
FIG. 11 shows a schematic view of the invented system for industrial buildings.

FIG. 11 presents a schematic view of an industrial building 110. The ground floor has no separating walls and can be open to the outside atmosphere, e.g. for unloading, etc. In this case, FirePASS should include separating partitions, or curtains 115, that can be dropped down in case of fire or installed permanently (e.g. in form of soft clear flaps).

The Hypoxic generator/compressor block 111 and gas storage container 112 are installed on the roof or outside of the building 110. The Building FirePASS delivers hypoxic air through distribution piping 1 13 and discharge nozzles 1 14. In the case of a localized fire (in a room or on an upper floor), the FirePass will instantly discharge hypoxic air in an amount that is sufficient to establish the Hypoxic Threshold of 16.8% O2, but comfortable enough for human breathing (14–15% recommended, or 10–14% for some applications).

When smoke and/or fire are detected on the ground floor, curtains 115 (which are stored in curtain holders 116) are released thereby separating the floor into localized areas. This will block the ventilation and movement of air. When fire is detected, the building's ventilation system should be immediately shut down. Hypoxic air is then instantly released into the affected area (and the adjacent area), causing the fire to be rapidly extinguished.

Curtains 115 should be made from a fire-resistant synthetic material that is soft and clear. Vertical flaps of the curtains 115 will allow for the quick exit of people who are trapped in the affected area.

FirePASS system can establish a hypoxic environment below Hypoxic Threshold on a specific floor or throughout an entire building. If required, this fully breathable, fire-suppressive atmosphere can be maintained indefinitely, providing a lifeline to people that are trapped inside. This embodiment is suitable for providing fire-preventive and fire-suppressive environments for numerous applications.

For example, nuclear power plants could be maintained in a fire-preventive state. If an accident does occur, than the oxygen content should be reduced to approximately 10%. This extreme hypoxic environment is still safe for a minimum of 20 minutes, giving trapped people time to escape and protecting their bodies from radiation that provides less damage when oxyhemoglobin saturation drops below 80%. When lower oxygen concentrations are used, breathing can be further stimulated by adding carbon dioxide to the fire suppressive agent.

Both Home FirePASS, and Building FirePASS, can be installed in a strictly preventive mode. In this case, storage containers 97, 104 and 112 become optional, as the generator will be constantly pumping hypoxic air into the distribution piping. This creates a permanent fire-preventative environment.

Figure 12:
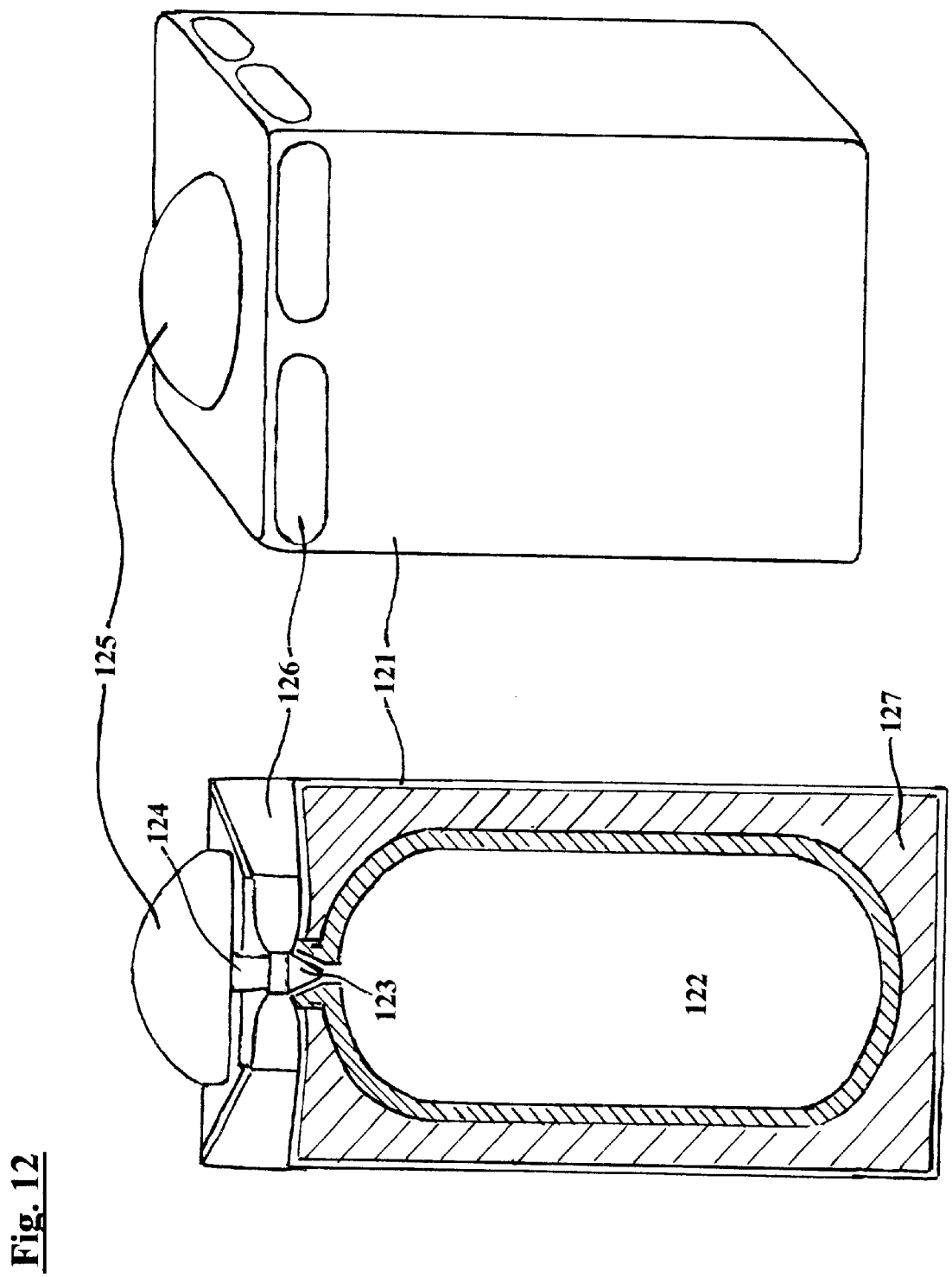
FIG. 12 presents schematic view of a portable fire-suppression system for selected rooms in any type of building.

Another cost effective solution would be to provide each room with its own automatic fire suppression apparatus. FIG. 12 shows a freestanding fire-extinguishing unit 121 having a gas storage container 122 inside. A release valve 123 (preferably burst disk type) can be opened by an electro-explosive initiator 124 that is actuated by a thermal/smoke-detecting device on the control block 125. When smoke or fire is detected, a signal from the control block 125 actuates the initiator 124. This causes the valve 123 to open and release the hypoxic fire extinguishing composition through discharge nozzles 126 in each room. An extended-life battery, with an optional AC power connection can power the control block 125.

Storage container 122 contains the appropriate quantity of the hypoxic fire suppression agent under high pressure. The oxygen content in the fire suppression composition is approximately below 10%, so when released, it will provide a breathable fire-suppressive atmosphere at or slightly below the Hypoxic Threshold. The amount of hypoxic fire-suppressive agent in the container 122 can be easily adjusted for each room by changing the gas storage pressure.

Carbon dioxide can be added to the fire-suppressive agent in necessary quantities, thereby replacing the corresponding part of nitrogen. This will stimulate the breathing process if the hypoxic atmosphere having an oxygen content below 14%. The amount of carbon dioxide added to the fire agent should be calculated so that its content in created fire-suppressive atmosphere will achieve approximately 4%–5%.

The container 122 is surrounded by protective filling 127 that cushions it against impact and provides it with thermal protection. Discharge nozzles 126 are equipped with silencers or noise traps in order to reduce the noise from discharging gas. Units 121 can be temporarily installed and are an excellent alternative to costly fire suppression systems that require permanent installation.

Figure 13:
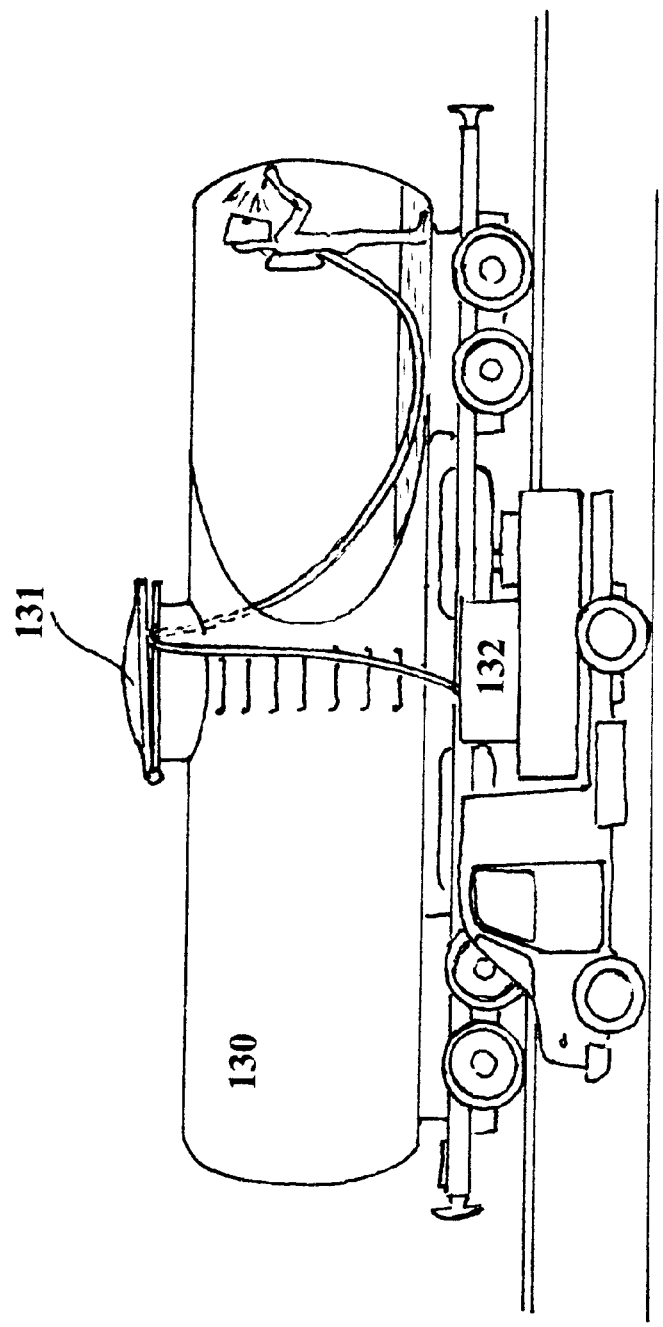
FIG. 13 illustrates the unique properties of the invented system in mobile modification.

FIG. 13 demonstrates the unique abilities of a mobile FirePASS system for industrial applications. For example, a broken tank or vessel 130 having a hatch 131 can be welded in a hypoxic environment. This is not feasible using current suppression systems as an empty container may still contain explosive vapors.

A Mobile FirePASS unit 132, producing approximately 2 cubic meters of hypoxic air per minute would quickly reduce the tank's 130 oxygen content to 14%. This hypoxic fire-extinguishing composition will be heavier than the explosive vapors in the ambient air. Consequently, it will act like a blanket, covering the surface of the inflammable liquid. Therefore a completely safe working environment will be created inside the tank 130. Lower oxygen concentrations can be used if the welder has a dedicated breathing supply. In this case, the welder will expire air with an oxygen content of approximately 16.5%. This level is close to the hypoxic threshold and will not negatively influence the surrounding environment.

In this environment all types of cutting or welding can be safely employed, including electric welding and oxygen-acetylene torches. Even if a spark, or molten metal touches the kerosene, ignition will not occur.

Similar mobile FirePASS units can be used in numerous applications where repair work must be done in an explosive or fire hazardous environment, e.g. inside a sea tanker, an underground gasoline vessel, a crude oil pipe etc.

Figure 14:
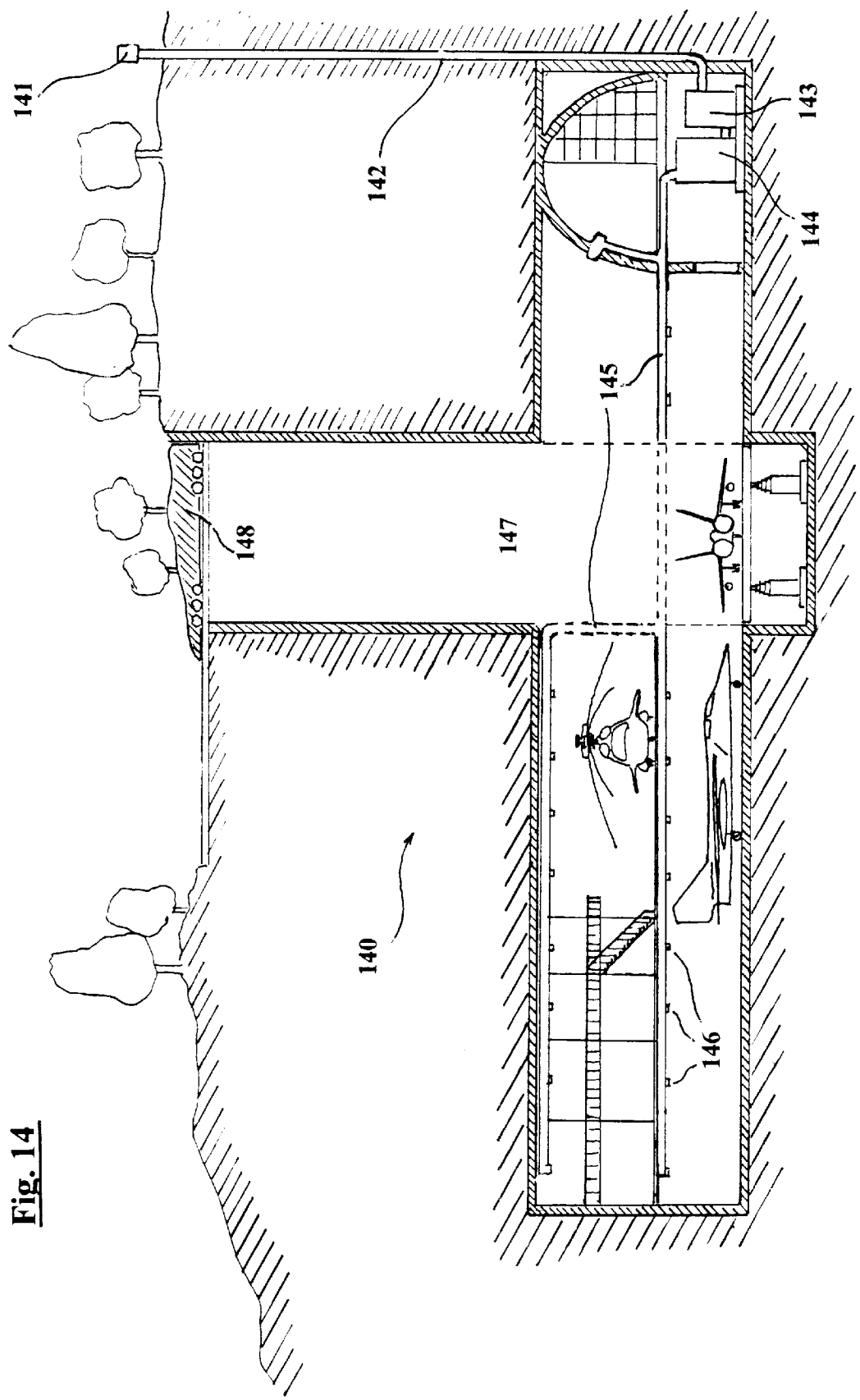
FIG. 14 presents a schematic view of the invented system when implemented into the ventilation system of an underground military facility.

FIG. 14 presents a schematic view of an underground military installation 140 being maintained in a constant hypoxic fire-preventive environment. This is provided by a special Underground FirePASS system. Ambient atmospheric air is taken in via a ventilation intake 141, which is installed at a remote location. It is then delivered through a ventilation shaft 142 into hypoxic generator module 143. A downstream-side filtering unit 144 purifies the air, eliminating chemical and bacteriological contaminants.

Hypoxic air having an oxygen content of approximately 15% is delivered from a generator 143 into ventilation ducts 145 with discharge nozzles 146 evenly distributed throughout the facility 140. This provides each room with a self-contained breathable fire-preventive atmosphere at a slightly positive barometric pressure. Excessive hypoxic atmosphere exits the underground facility 140 via an elevator shaft 147 with a protected one-way ventilation opening on top (not shown). When the exit cover 148 of the shaft 147 slides open, the positive pressure and higher density of the hypoxic air prevents outside air from rushing in, which provides additional important feature of the system This fire-preventive atmosphere provides additional protection from an explosion (e.g. from a penetrating bomb or internal accident) by stopping fire from propagate inside the facility.

Figure 15:
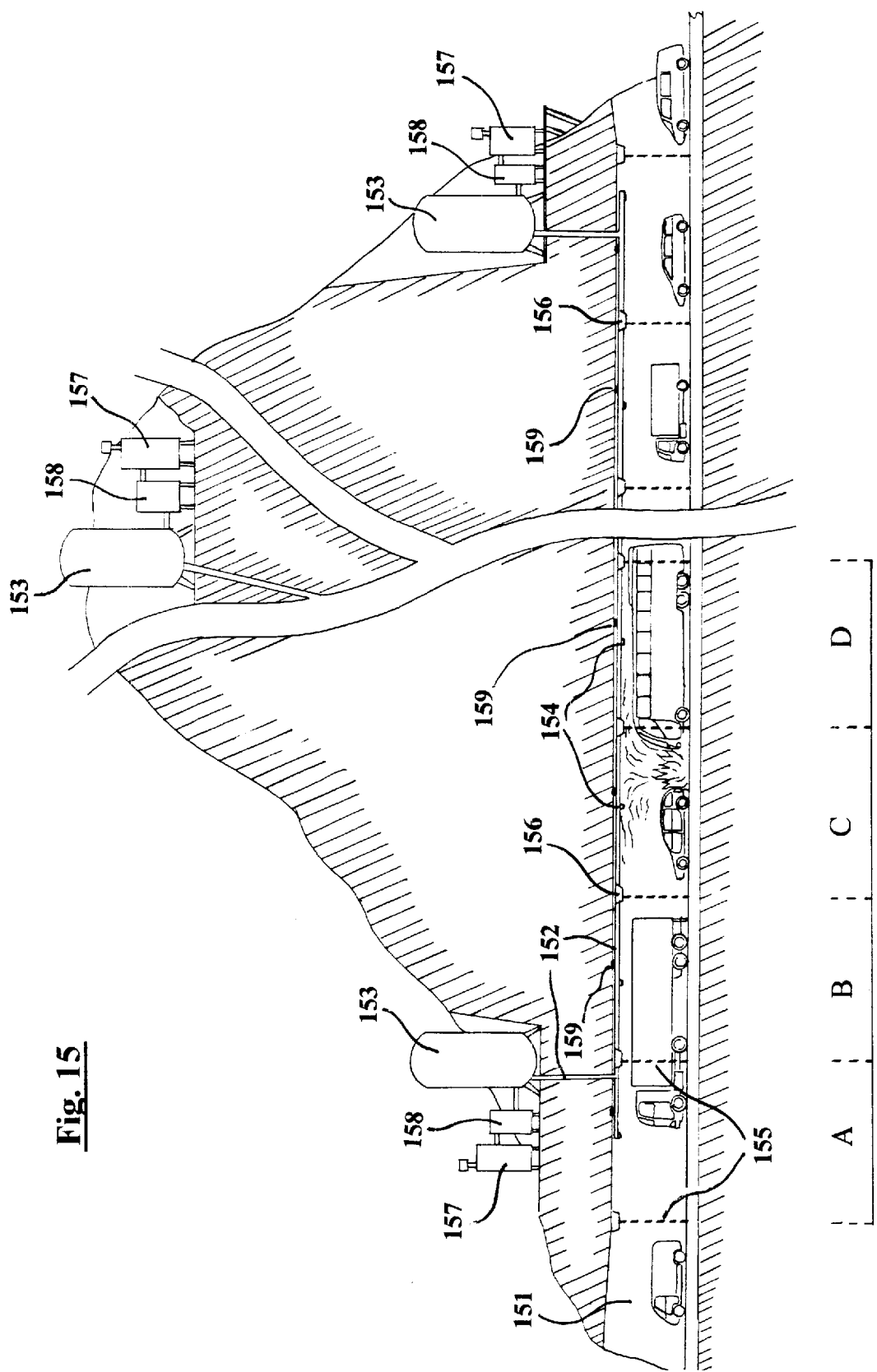
FIG. 15 presents a schematic view of the system's working principle in an automobile tunnel.

FIG. 15 presents a schematic view of the Tunnel FirePASS system for automobile tunnels. This fire suppression system is self-adjustable and fully automatic.

A high-pressure pipe 152 runs throughout the length of the tunnel 151. It can be installed alongside a wall 151 or below the ceiling. The pipe 152 is connected to a high-pressure container 153 outside the tunnel 151. The result of this configuration is a fully enclosed high-pressure gas circuit 152–153. For longer tunnels it is advisable to have separate systems on each end. Additional systems can be added, if necessary, in selected sections. For example, a 25 km tunnel recently opened in Norway would require at least 10 additional FirePASS units installed throughout its length.

Gas discharge nozzles 154 are distributed evenly throughout the full length of the tunnel. Each nozzle 154 services a separate section of the tunnel e.g. A, B, C, etc. A ventilation system of the tunnel is not shown on this drawing in order to simplify this presentation. In case of a fire, each sector can be separated with soft flap curtains 155, held normally in curtain-holders 156

A Hypoxic generator 157 is installed outside the tunnel and communicates with a high-pressure vessel 153 through the compressor block 158. High-pressure container 153 and a pipe 152 contain breathable hypoxic air with an oxygen content below 15%. Generated by the hypoxic generator 157 and delivered into a container 153 via the compressor block 158, this air is at a barometric pressure of approximately 200–300 bar. Longer tunnels require the installation of multiple Tunnel FirePASS units as shown in FIG. 15.

The working principle of this embodiment can be explained as follows. If a fire occurs in section C it will be immediately detected by heat/smoke detectors 159 which are distributed at 5-meter intervals throughout the tunnel. The curtain holders 156 located between sections A, B, C, D and E will release flexible, transparent curtains. This will separate the fire in section C from the rest of the tunnel.

Figure 16:
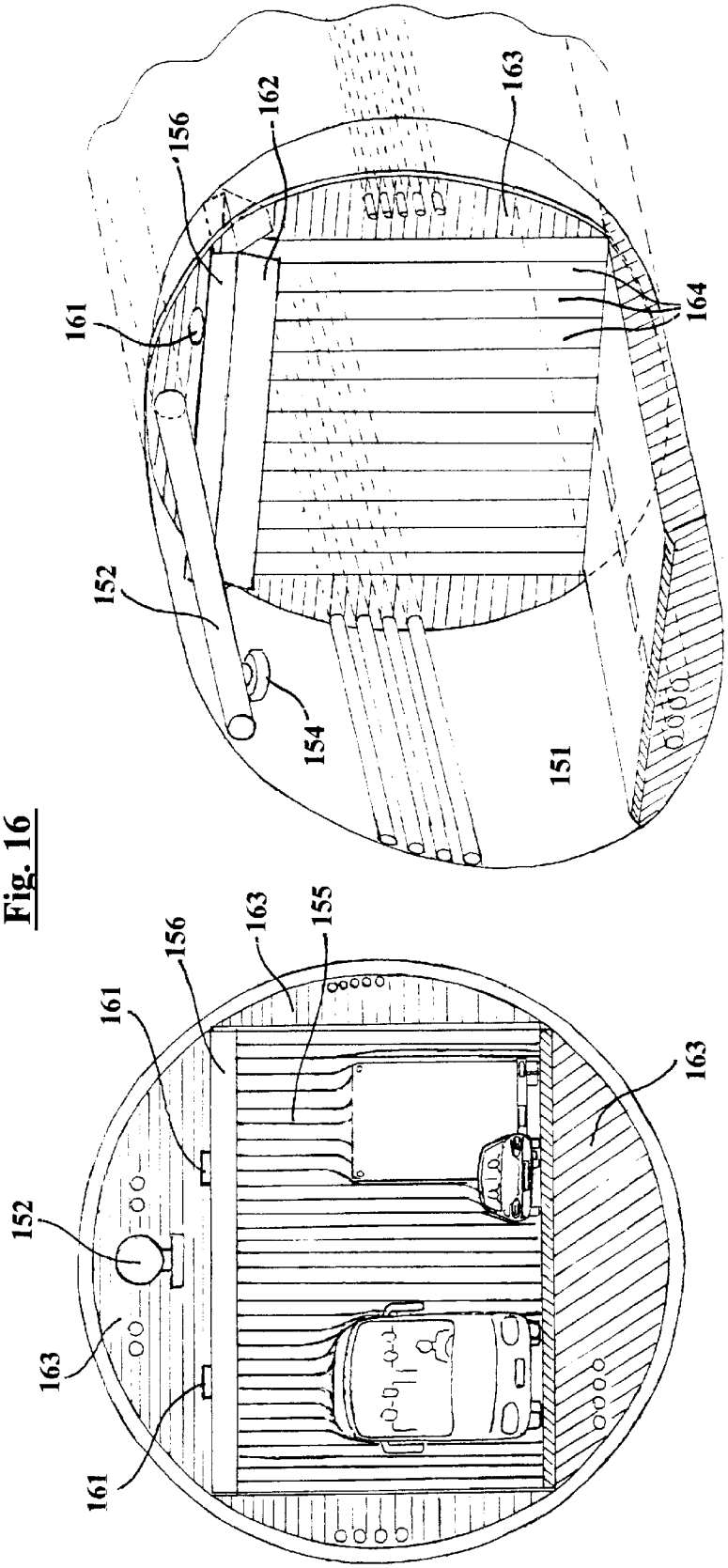
FIG. 16 presents a schematic cross-sectional view of a tunnel with a localizing curtain-deployment system.

As shown in FIG. 16, the curtains 155 will be made from a synthetic material and have soft transparent flaps. These curtains 155 can be instantly inflated by a high-pressure gas cartridge or a pyrotechnic cartridge 161. These cartridges will be similar to those used in inflatable automobile bags. The cartridge will be initiated by a signal from the smoke/fire detectors 159. Suitable detection equipment is available from numerous manufacturers.

Simultaneously, the tunnels internal ventilation system will shut down and discharge nozzle 154 in section C will release hypoxic air under high pressure. This hypoxic air is stored in the pipe 152 and the container 153. The volume of hypoxic air released into section C will exceed the volume of section C by several times. Therefore, sections B, C and D will undergo complete air exchange, ensuring the quick establishment of a breathable fire-suppressive environment. In shorter tunnels (under 1000 m) the volume of hypoxic air should be sufficient to fill the entire tunnel.

To calculate the amount of the hypoxic fire-extinguishing composition that needs to be released from the circuit 152–153 into sections B, C and D, a final concentration of 13% to 15% oxygen should be used in the fire-suppressive atmosphere where it should be released. This corresponds to an altitude between 2700 and 3800 meters, which is still suitable for human breathing. This hypoxic environment will instantly suppress any fire: This includes chemical fires, electrical fires, fires induced by inflammable liquids and fires from gas detonations. In addition, this environment will instantly suppress a fire from an explosion. This provides significant protection against a terrorist attack.

Nozzles 154 are equipped with special silencers to reduce the noise resulting from the high-pressure gas release. To alarm people both inside and outside the tunnel, it is also recommended that air sirens be attached to the silencers. In addition, as the oxygen content drops below Hypoxic Threshold, the combustion engines of the trapped automobiles will become inoperable. Consequently, there will be sufficient breathable air for many hours.

Gas release from the nozzles 154 is initiated by a signal from an automated system of fire detectors 159. It is recommended that the volume of hypoxic air in the system 152–153 be sufficient to fill the entire tunnel. If this is not feasible, then the volume should be great enough to fill the affected section and those adjacent to it.

In some applications the pipe 152 can be kept at standard pressure, thereby reducing its weight. This can be accomplished by keeping the high-pressure hypoxic air strictly in the vessel 153. It is then released into the pipe 152 in case of fire. Consequently, a lighter and less expensive discharge mechanism at nozzles 154 can be used. However, this requires the installation of a computerized fire detection and gas release system that automatically opens the release valve from the vessel 153 and feeds the hypoxic air into the pipe 152, which is then released through the nozzle 154 into the required sections.

If a fire breaks inside the tunnel 151 then localizing drop curtains 155 would be released throughout the entire tunnel (preferably every 50 to 100 meters). This will establish breathable fire-suppressive hypoxic environment throughout the tunnel and prevent any ventilation. In addition, accidents will be avoided as the hypoxic environment prevents combustion in automobile engines.

After the appropriate personnel declare the tunnel safe, the discharge system will be closed and the curtains 155 will be retracted into the curtain holders 156. The ventilation system of the tunnel 151 will then be reopened, bringing in fresh air.

The oxygen content inside the tunnel will rapidly increase to 20.9% (the normal ambient concentration at any altitude), allowing combustion engines to resume normal operations.

Pressure monitoring transducers installed at the vessel 153 will turn on the hypoxic generator 157 and the compressor block 158 in case if the storage pressure drops, which may occur during maintenance or fire emergency. This automatic refill ensures that the system will always be ready to suppress a fire.

The Hypoxic generator 157 intakes ambient air from the outside atmosphere and extract from it a part of oxygen. It then directs the oxygen-depleted air with O2 content below 15% to the compressor block 158. Once there it is compressed to a barometric pressure of approximately 200 bar and then delivered into the vessel or storage container 153, communicating directly (or through a release valve) with the pipe 152.

As previously stated, curtains should be made from synthetic material. They should be soft, transparent and filly inflatable. They should have long vertical flaps, which overlap each other horizontally (as shown on FIG. 16).

These specifications insure the easy passage of vehicles through the curtains 155, as their transparent nature will not obstruct a driver's view. They will provide sufficient sector-separation, even if a truck stops directly beneath them. Similar curtains have been successfully used by Hypoxico Inc.'s Hypoxic Room System to separate the hypoxic environment from the outside atmosphere.

FIG. 16 is a cross-sectional view of a cylindrical tunnel 151, focusing on the preferred embodiment of the curtain deployment system.

The curtain 155 is folded inside the curtain holder 156. A signal from a smoke/fire detection system initiates a high-pressure or pyrotechnic cartridge 161, which results in the release of gas. This causes the curtain 155 to inflate. The inflating curtain 155 pushes open the cover 162 of the curtain holder 156 and drops down to the pavement. Separate cartridges 161 may be installed above each traffic line.

Additional separating segments 163 are installed at both sides of the curtain, above and under the pavement, allowing communication cables and pipes to pass through. Segments 163 are installed only at places where curtains 155 are installed. This combination provides a substantial air obstruction between separated sections, preventing natural ventilation. However, the curtains 155 do not prevent hypoxic air released by the FirePASS to pass through them. Vertical segments 163 should be made from a soft plastic material in order to prevent damage to vehicles.

Electronic switches, thermal/smoke detectors, valves and monitors that are installed inside the tunnel will initiate the release of the hypoxic agent. These components are widely available so they will not be described further. Various models of hypoxic generators 157 are offered solely by Hypoxico Inc. of New York. Various oxygen extraction devices can be used for this application including but not limited to: pressure-swing absorbers, cryogenic air liquefiers with centrifugal separators, membrane separators, and units using electric current swing adsorption technologies. Multiple stage compressors 158 that compress air up to 200 bar or higher are also available from numerous manufacturers throughout the world.

In certain cases, calculated amounts of nitrogen can be used to fill the high-pressure system. This will reduce the size, and weight of the system, but will require additional safety and monitoring equipment. When released, the exact amount of nitrogen would mix with internal air providing hypoxic environment with oxygen content of 15%, or lower, if needed.

Figure 17:
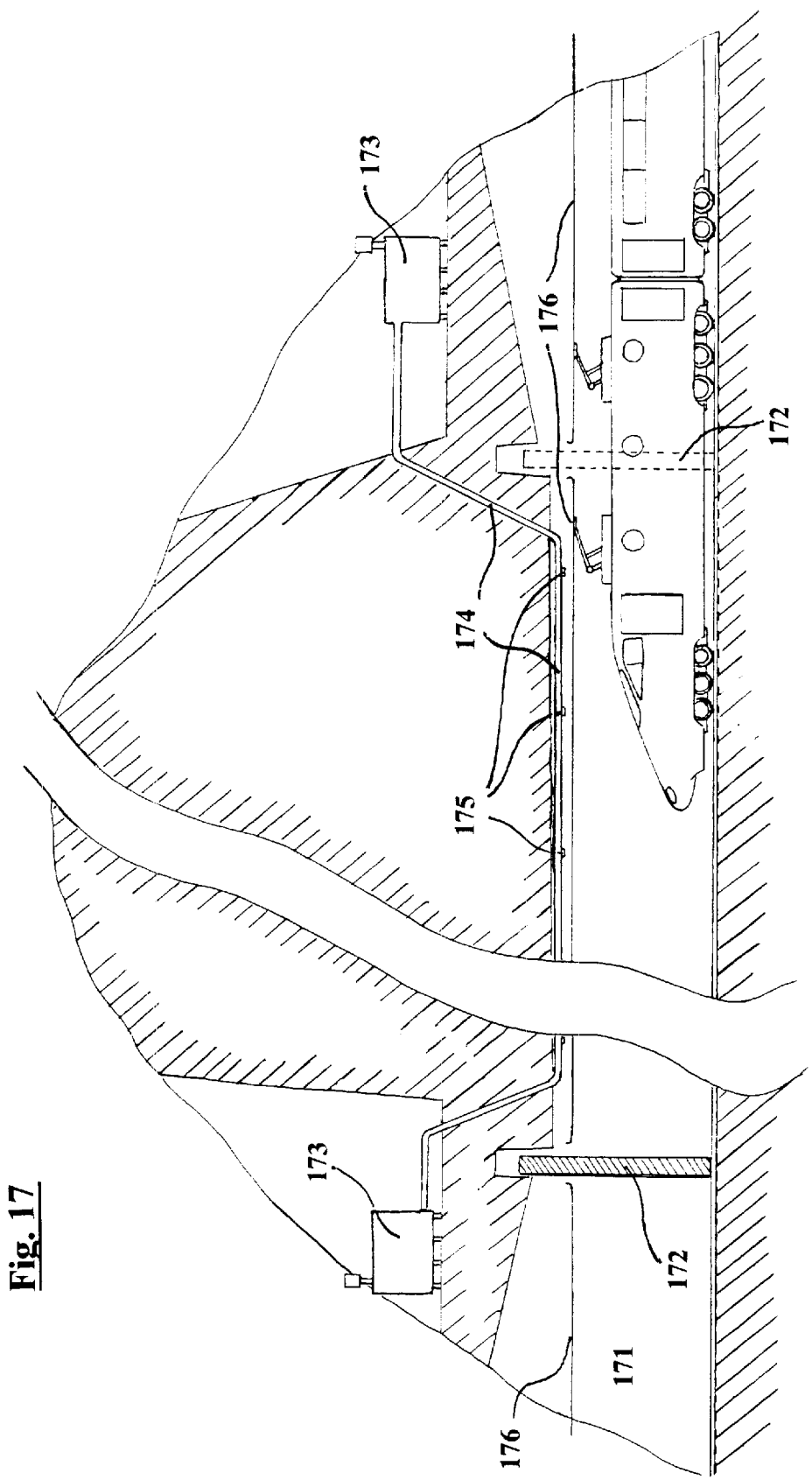
FIG. 17 shows a schematic view of the invented system for electric railroad or subway tunnels.

FIG. 17 presents a schematic view of a cost-effective Tunnel FirePASS for electric powered trains and other vehicles that do not use combustion engines. This embodiment allows the inside of the tunnel 171 to be maintained in a fire preventive environment, at or below the Hypoxic Threshold. However, this embodiment is not suitable for automobile tunnels, as combustion engines will not operate in such hypoxic environment.

The tunnel 171 is equipped with two separating doors 172 in the closed position, one on each end. When a train approaches the tunnel 171, the first door 172 opens, allowing the train to pass, and closes thereafter. As the train approaches the end of the tunnel, the second door opens, allowing the train to exit. One or more hypoxic generators 173 that have been installed outside the tunnel supply hypoxic air to the interior of the tunnel 171. Hypoxic air with an oxygen content between 14 and 15% is created by the generator and then delivered inside the tunnel 171 through piping 174 and nozzles 175. This maintains a constant fire-preventive environment in the tunnel and transmits it inside the train, since its interior becomes ventilated with the hypoxic air.

The doors 172 can be made in different shapes, e.g. a slide, swing or folding doors being opened vertically or horizontally. Such doors are available by numerous manufacturers. Doors should be installed approximately 10 to 20 meters inside the tunnel to prevent them from being blocked by snow or ice. The electric contact cable 176 can be interrupted at the doors 172 or other joints and obstacles.

Figure 18:
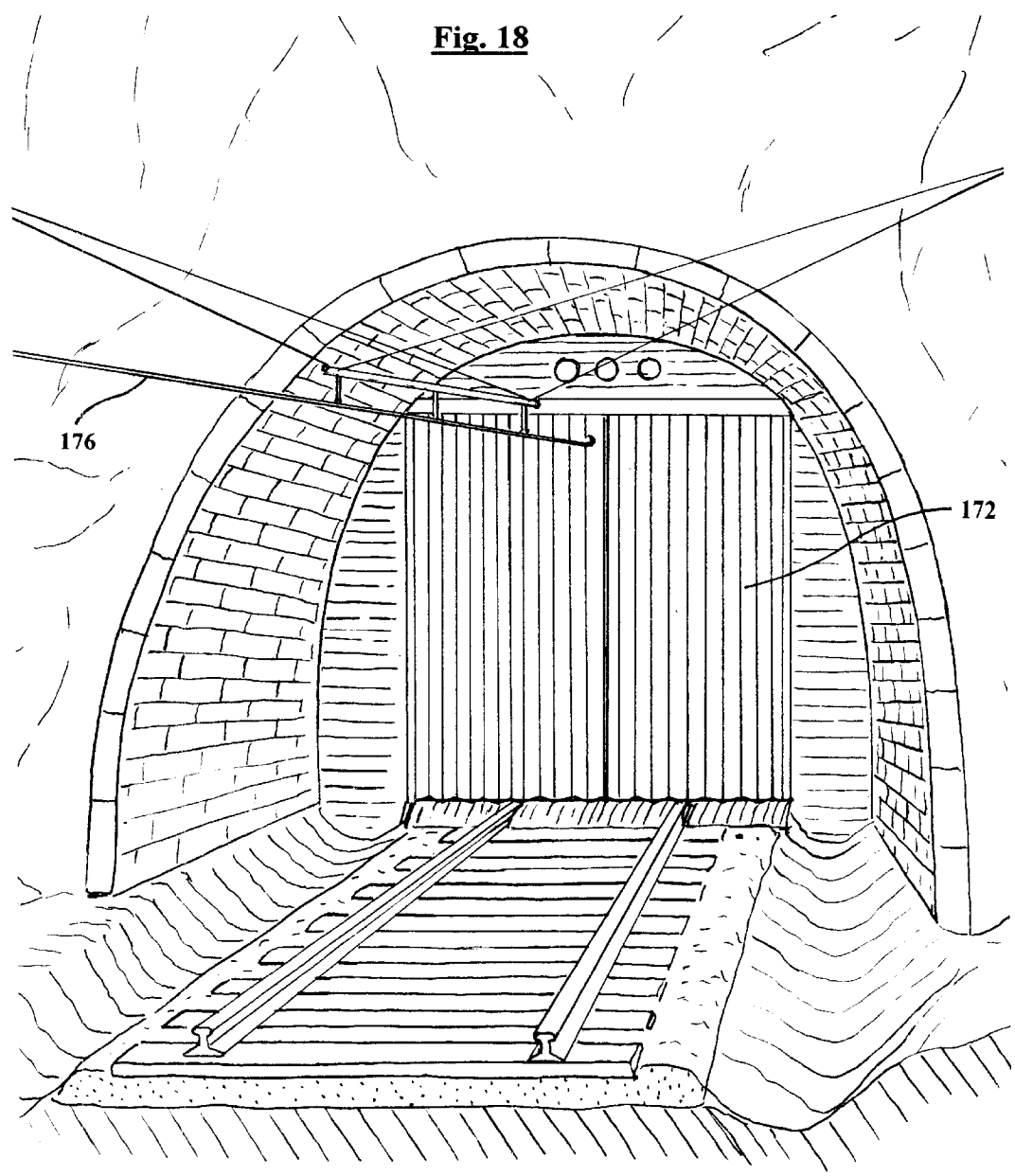
FIG. 18 shows a frontal view of the tunnel's entry, with separating door.

FIG. 18 shows a frontal view of the tunnel's entry with a closed door 172.

Figure 19:
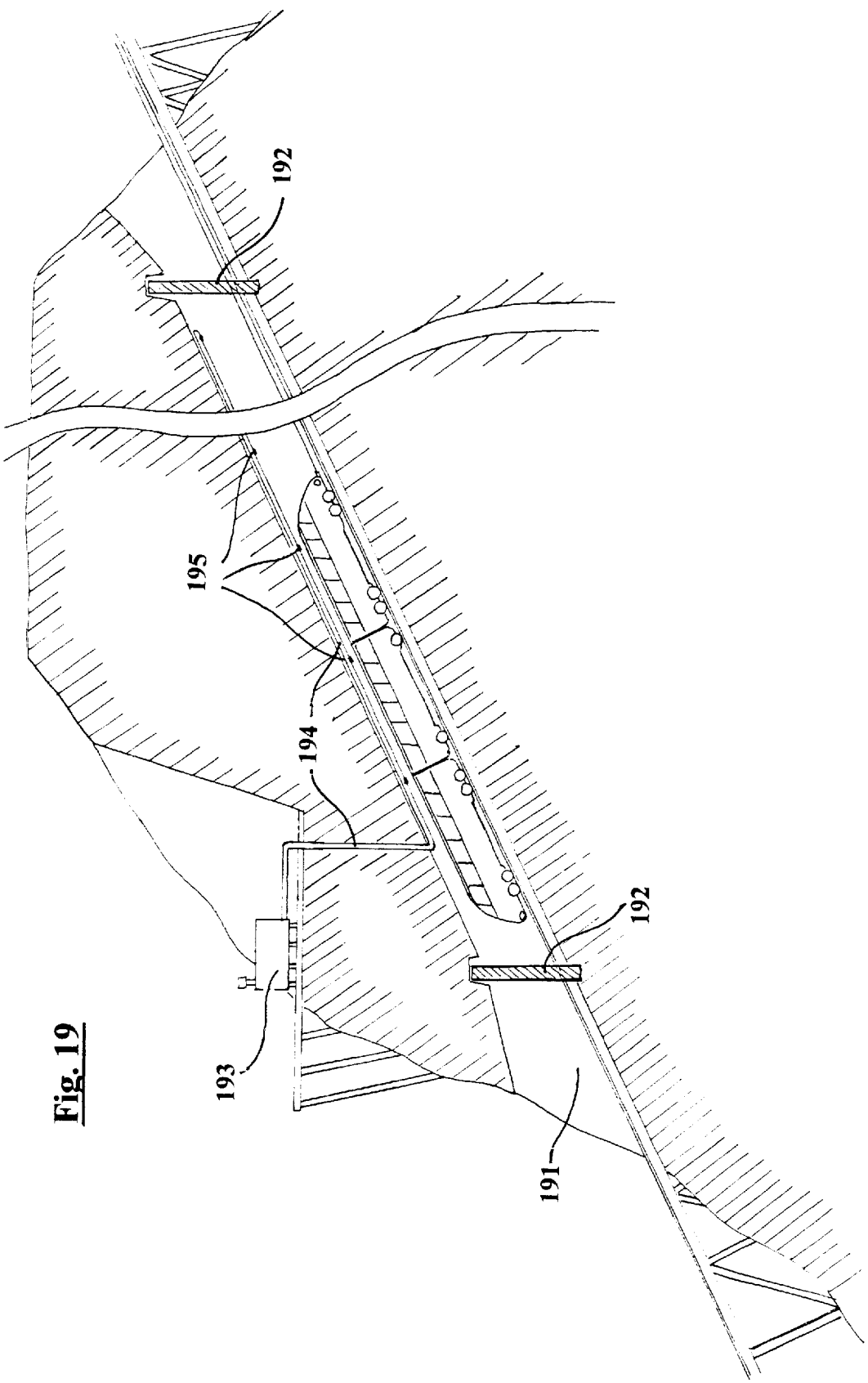
FIG. 19 presents a schematic view of the invented system for tunnels of mountain ski trains or funiculars.

FIG. 19 presents a schematic view of a ski train tunnel 171 similar to the one in Kaprun, Austria (where 159 people died in fire in November of 2000). With a length of 3.3 km, this 3.6-meter-diameter tunnel has an average gradient of 39°. This caused a "chimney effect" which sucked air from the bottom of the tunnel, thereby fanning the flames.

Doors 192 will prevent such a draft, keeping the fire-preventive environment inside the tunnel 191. Through a pipe 194 and evenly distributed (every 50 meters) discharge nozzles 195, a hypoxic generator 193 will provide the tunnel with the breathable fire-extinguishing composition at 15–16% oxygen content. Automatic doors 192 open when the train approaches, similar to doors 172 in the previous embodiment.

In addition, the oxygen-enriched fraction produced during the extraction process can be forwarded to wastewater treatment plants, fisheries, metallurgy plants, paper bleaching and food processing plants, and other businesses, providing great benefit to the local economy.

Figure 20:
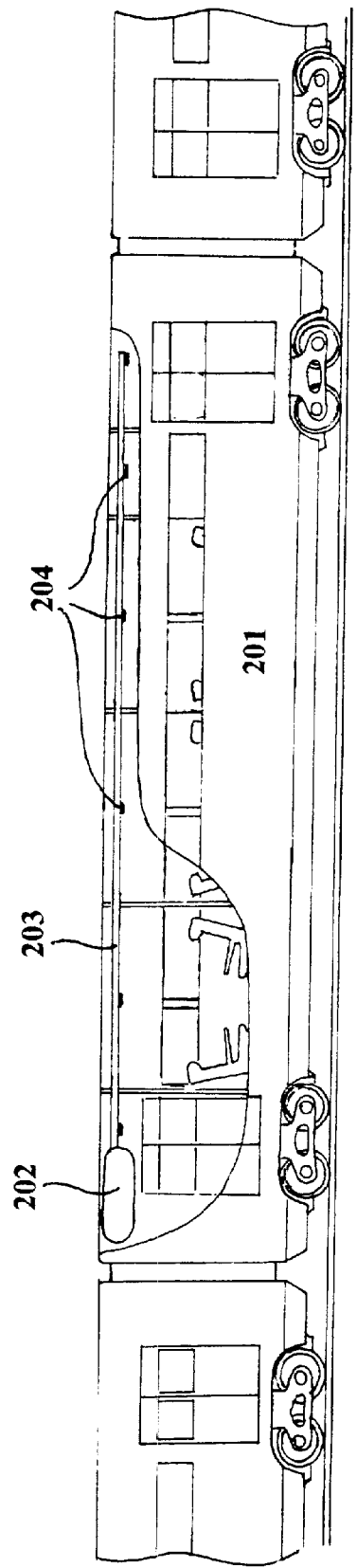
FIG. 20 shows a schematic view of the On-Board Fire-PASS that can be used in trains, buses, subway cars or other passenger vehicles.

FIG. 20 shows a schematic view of an On-Board FirePASS system for passenger trains, buses, subway cars and other passenger vehicles.

This embodiment presents the installation of a fire suppression system inside a railroad passenger car 201. A high-pressure storage container 202 filled with the hypoxic fire suppression agent is mounted under the ceiling or on the roof of the car 201. A container 202 is equipped with a discharge valve connected to distribution piping 203. Hypoxic agent is then discharged through discharge nozzles 204.

When fire is detected, a burst disc discharge valve (not shown) will be initiated by an electro-explosive initiator. Burst disc discharge valves and electro-explosive initiators are available from Kidde-Fenwal Inc. in the U.S.A. Suitable containers, piping and nozzles are also available from numerous manufacturers.

Hypoxic fire suppression agent with oxygen content below the Hypoxic Threshold is stored in container 202 under a barometric pressure of approximately 100 bar. Much lower oxygen concentrations can be used (from 0.01 to 10% O2) since it is easy to calculate the volume of the fire agent that is necessary upon release in order to create a breathable fire-suppressive environment at Hypoxic Threshold. This lower oxygen content allows to reduce both the volume and weight of the high-pressure storage container 202.

For instance: in order to achieve fire-suppression at an oxygen concentration of 16%, a car or bus interior with a volume of 200 m3 would require approximately 75 m3 of a 2% oxygen hypoxic gas mixture. At 100 atm pressure it would require only 700-liter storage container or seven 100-liter containers. The latter container would be substantially easier to install in a car 201. Pure nitrogen can be used as well, as long as it is released through multiple nozzles for better distribution. In this case, the oxygen content in the interior of the car must reman between 12% and 16%. This would require only 60 m3 of nitrogen. This can be stored in 600-liter container at 100 atm (or 300 liter container at 200 atm pressure).

All nozzles must be equipped with silencers, to reduce the noise that is created by the release of high-pressure gas.

The On-Board FirePASS can be installed on buses, ferries, funiculars and other passenger vehicles. Personal automobile fire-suppression systems can also be built using the same solution.

Successfully suppressing a fire on board an in-flight aircraft is extremely difficult, as the majority of theses fires are caused by electrical defects inside the aircraft.

In order to save on weight, an airplane's construction is not strong enough to be pressurized at sea level. Consequently, all passenger aircraft are pressurized at altitudes ranging from 2 to 3 km. This reduces the pressure differential between the internal and external atmosphere while the plane is in flight. As a result of this the plane's internal atmosphere has a lower partial pressure of oxygen. However, the internal atmosphere still has an oxygen content of 20.94%. Therefore, to achieve a fire preventative state (Hypoxic Threshold) an atmosphere corresponding to an altitude of approximately 4 km would have to be created. This would be too uncomfortable for most passengers. This unfortunate condition restricts the use of the FirePASS system in the preventive mode in current passenger airplanes.

Figure 21:
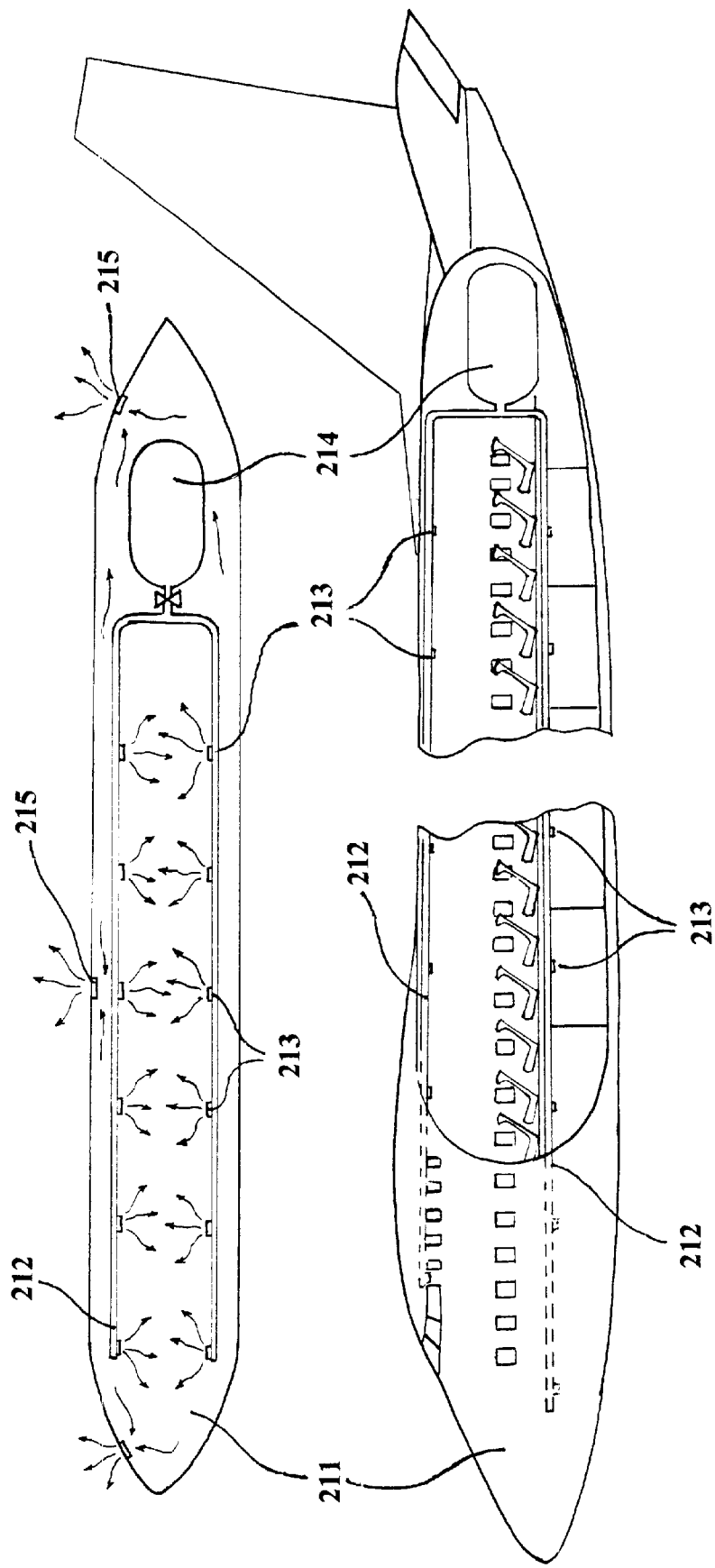
FIG. 21 illustrates the implementation of the FirePASS technology into the ventilation system of a current passenger airliner.

FIG. 21 shows the implementation of the FirePASS technology into the ventilation system of a passenger airliner 211. All such airplanes depend on the outside atmosphere for fresh air. This requires a complicated air-intake system that will not be described here. A ventilation system with distribution piping 212 and nozzles 213 provides a normal mixture of recycled air (along with a small amount of fresh air). The piping 212 communicates with a high-pressure storage container 214 that is filled up with hypoxic fire-suppressive agent. The container 214 is equipped with a release valve, which is initiated by an electro-explosive device described in the previous embodiment shown in FIG. 20.

In case of fire, the on-board fire/smoke detection system provides a signal that initiates the actuation of the burst disc valve by an electro-explosive device. Hypoxic fire suppression agent is released into the ventilation system and is evenly distributed throughout the plane. The upper portion of FIG. 21 shows the movement of hypoxic air throughout the plane. The amount of the hypoxic agent that is released must provide a hypoxic threshold throughout the entire airplane. The signal from the fire/smoke detection system will also close the intake valves that allow fresh air to enter the plane. A storage container (or multiple containers 214) containing hypoxic agent at a barometric pressure at approximately 50 bar should be equipped with a gradual release valve and silencer.

Excessive internal atmosphere is released from the airplane through a pressure-sensitive relief valve 215 that is initiated by pressure increase inside the aircraft. This will provide sufficient air change inside the aircraft, removing smoke or toxic fumes from the fire source. The atmosphere aboard the aircraft win now be at the Hypoxic Threshold and will be suitable for breathing for a limited period of time, even for the sick and elderly. This limited breathing time will be sufficient, as a fire will be suppressed in a matter of seconds. However, if exposure to the hypoxic environment must be prolonged, the simultaneous release of oxygen masks will allow passengers to remain comfortable. In order to counterbalance the effect of hypoxia human body a necessary amount of carbon dioxide can be added to the hypoxic fire agent that being released will create a breathable fire-suppressive atmosphere with 4%–5% of carbon dioxide. This will allow safely maintaining such atmosphere for hours without any discomfort or risk for passengers' health. The effect of supplementary carbon dioxide is explained further in FIG. 33 and 34.

This method of fire suppression will immediately squelch any fire. Even smoke that may be produced by residual glowing will be eliminated. Consequently, the safety of the people aboard the aircraft will be guaranteed.

FIG. 22 presents the FirePASS system aboard the next generation of airplanes that will fly above Earth's atmosphere (including spaceships). These vehicles, which are similar to NASA's Space Shuttle, do not depend on the intake of fresh air, as they are equipped with autonomous air-regeneration systems. Consequently, these vehicles are pressurized at sea level.

For decades, researchers from NASA (along with other space agencies) have been trying to find a human-friendly solution to suppress fires on board space vehicles (and space stations). The most advanced fire-suppression technology currently available uses carbon dioxide as the fire-suppressant. The advantage of using carbon dioxide is that it can easily be removed from the enclosed atmosphere by absorbers utilized in life-support systems. However, the main drawback of carbon dioxide is that upon its release, the atmosphere becomes non-breathable.

The implementation of the FirePASS system on such an aircraft (or space shuttle 221) requires the initial establishment and maintenance of the hypoxic threshold in the atmosphere on board of the vehicle. On the ground the vehicle 221 has been ventilated through with hypoxic air supplied by the mobile FirePASS generator 222. Passengers can board the vehicle at the same time through an antechamber-type gate.

Upon the completion of full air exchange, the atmosphere will be at the Hypoxic Threshold. The door of the vehicle 221 can now be closed and the cabin can be pressurized. The internal atmosphere will now be recycled by an autonomous air-regeneration system 223. This system 223 contains a special chemical absorber (a complex composition of lithium and potassium super oxides) that absorbs carbon dioxide and produces oxygen. The control system is set to maintain oxygen content at the desired level (15–16% recommended). One of the key benefits of the FirePASS technology is the ease in which it can be installed in vehicles of this nature, as no hardware modifications will be necessary.

Other inert gases such as argon and xenon, etc. (or mixtures thereof) can also be used in as fire-extinguishing ballast. However, the hypoxic threshold will be slightly different for each gas mixture.

Future generations of engines for aircraft and most other vehicles will consume oxygen extracted from atmospheric air, which leaves large amounts of hypoxic air that can be used for ventilation of the vehicle's interior. A cryogenic air separation device can liquefy atmospheric air and extract oxygen in a centrifuge. Remaining nitrogen-enriched fraction can be warmed up to a desired temperature in a cooling system of an engine and provided for ventilation of the aircraft or vehicle interior. Such hypoxic air composition with oxygen content of approximately 16% will provide a healthy, comfortable environment with 100% protection against fire.

The same fire-preventive composition is suitable for all hermetic objects including space stations, interplanetary colonies, and underwater/underground facilities and vehicles. In the future, most of buildings will contain an artificial atmosphere that can be protected against fire by establishing a hypoxic environment with oxygen content below 16.8%. Such building can use similar cryogenic oxygen-extraction system for both, producing artificial fire retarding atmosphere and generating oxygen for its own energy system.

FIG. 23 shows a hermetic object with an artificial atmosphere. The on board life support system (not shown) incorporates the autonomous air-regeneration system 231, maintaining a healthy comfortable environment at the Hypoxic Threshold.

The regeneration block 232 collects expired air through air intakes 233 and piping 234. The equipment on this block 232 removes a portion of the water and sends it to the water regeneration block of the main life-support system. Dehumidified air is sent into the block's regenerative absorber 232 where excessive carbon dioxide is absorbed. In addition, an appropriate amount of oxygen is added, thereby insuring that the internal atmosphere is maintained at the Hypoxic Threshold. A computerized control unit 235 maintains the temperature, the humidity, and the oxygen/carbon dioxide balance in the air-supply system 237. Nozzles 238 are distributed evenly throughout the enclosed space, or in each enclosed compartment. Supplemental oxygen (and nitrogen, if needed) is stored in containers 239. However, once the inert ballast of nitrogen is introduced into the internal atmosphere, it will remain there without needing further regeneration. This ballast will automatically prevent oxygen content from rising above the initial settings, providing an additional safety in a case of failure of the computerized control equipment.

The same breathable fire-preventive composition with can be used in submarines, underground and underwater facilities, space and interplanetary stations.

These environments have one thing in common: they cannot rely on the outside atmosphere for ventilation or air exchange. Fires in such environments are extremely dangerous and difficult to suppress. Oxygen is typically generated through chemical, biological or electrolytic means. In a modem spaceship (or space station) oxygen must be stored onboard the vehicle prior to liftoff.

If the maintenance of a constant hypoxic environment (fire preventive mode) is not feasible, then the system can be maintained in its fire-suppression mode. It can then be introduced when required. Depending on the size of the environment, the vehicle can be divided into fire-suppression zones. Localization can be achieved by separating different sectors of the environment with inflatable air curtains, hermetic doors or hatches. In case of fire the necessary amount of the hypoxic fire suppression agent will be introduced into the localized sector, instantly creating a hypoxic environment under the Hypoxic Threshold.

Figure 24:
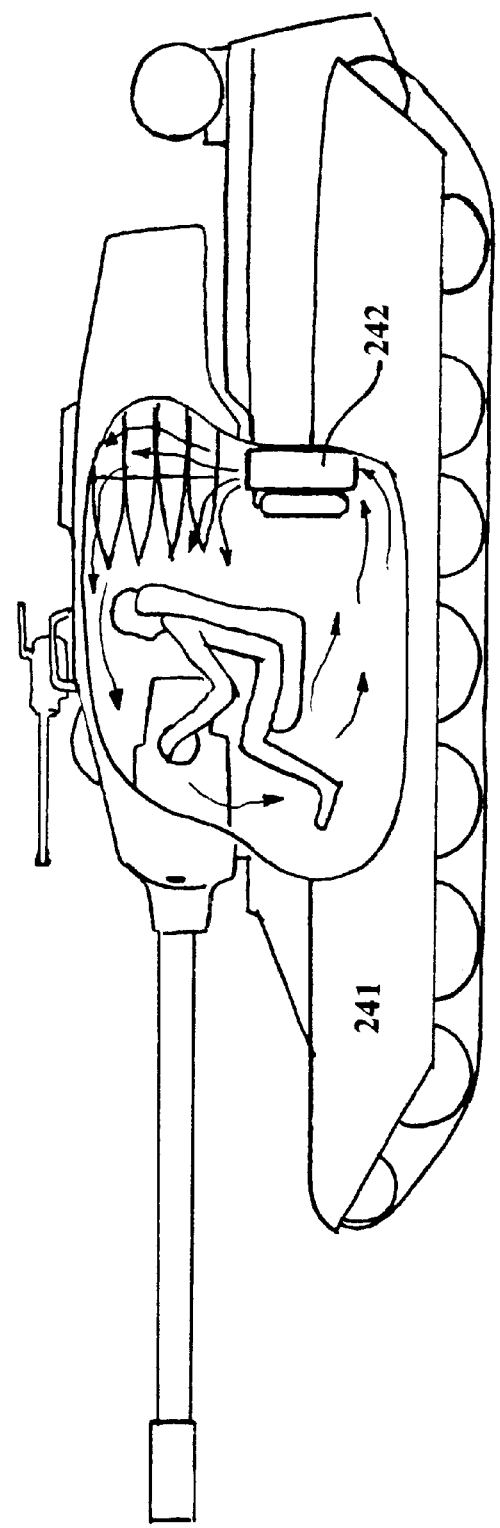
FIG. 24 shows the implementation of the hypoxic Fire-PASS technology into an autonomous air-regenerative system of a military vehicle.

FIG. 24 shows the implementation of the FirePASS technology into the autonomous air-regenerative system of a military vehicle. The tank 241 has a hermetically sealed environment with an internal breathable atmosphere under the hypoxic threshold. The working principle of this system is identical to the one that was described in the previous embodiment (FIG. 23).

The air-regeneration system 242 employs a chemical absorbent that adsorbs carbon dioxide and releases the appropriate amount of oxygen. This maintains the internal atmosphere of the vehicle below the Hypoxic Threshold (preferably from 12 to 13%). Military personnel can easily adapt to this environments by sleeping in a Hypoxic Room System (or Hypoxic Tent System) manufactured by Hypoxico Inc.

The same concept applies to military aircraft, submarines and other vehicles. One of the key advantages of employing a hypoxic, fire-extinguishing composition in military vehicles is that it provides a fire-safe internal environment for the soldier, even if the vehicle is penetrated by ammunition.

Hypoxic fire-prevention compositions and methods employing FirePASS technology guarantee that a fire will not get started under any circumstances.

Figure 25:
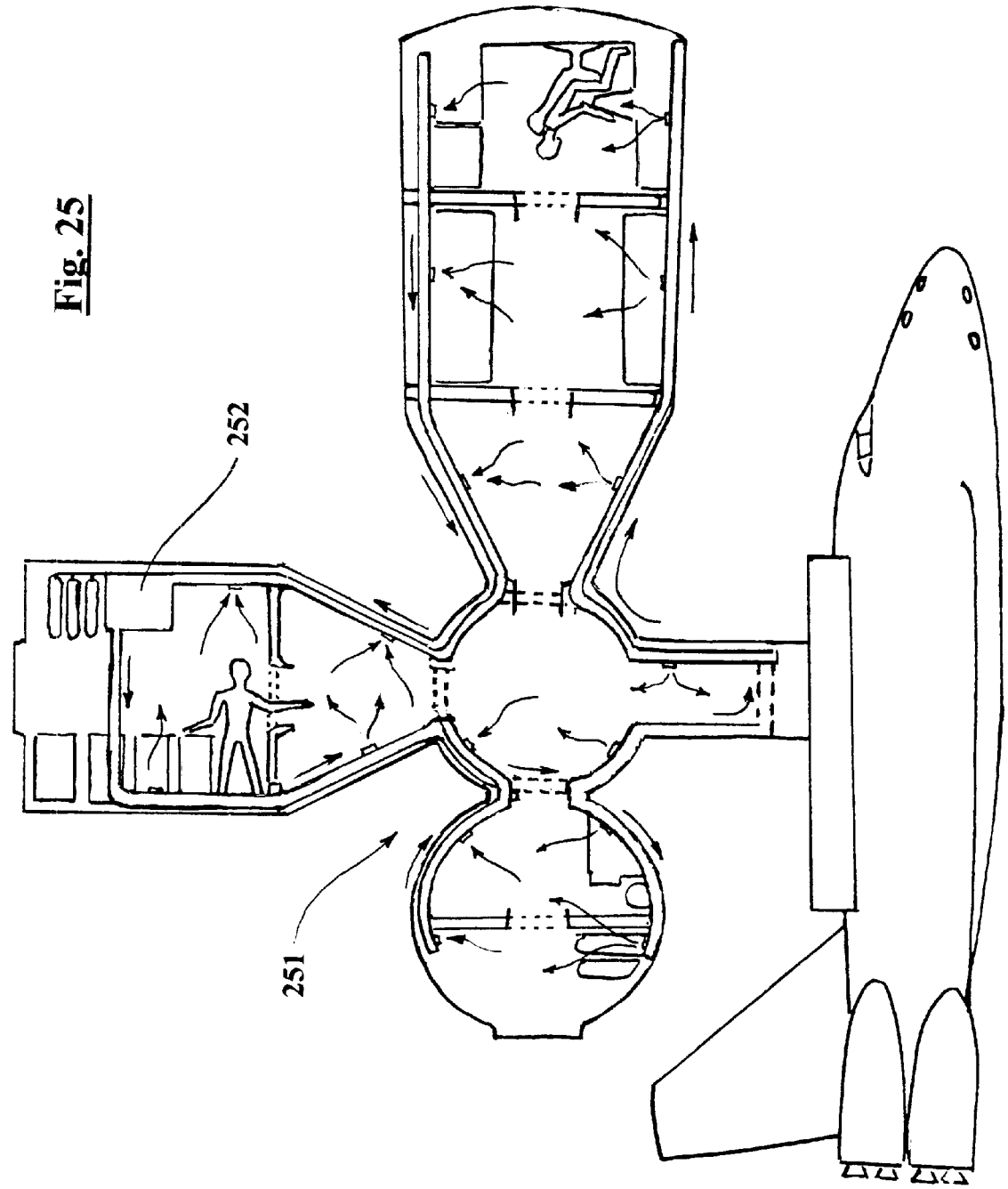
FIG. 25 presents a schematic view of a hypoxic fire-extinguishing breathable composition as part of the internal atmosphere of a space station.

FIG. 25 is a schematic view of a space station 251 employing breathable hypoxic fire-preventive composition as its permanent internal atmosphere. The air-regeneration system 252 continuously collects expired air from the station's inhabitants. It then provides a comfortable fire-preventive atmosphere with oxygen content at or below the Hypoxic Threshold (15% level recommended). The working principle of this system is shown schematically in FIG. 23.

The greatest advantage to implementing a breathable, fire-preventive composition into a hermetic, human-occupied environment is its ability to automatically maintain the Hypoxic Threshold. Once introduced, the inert nitrogen gas from the hypoxic composition will always be present in such artificial atmosphere in its original concentration—no refill or regeneration will be required. It cannot be consumed by the inhabitants or adsorbed by an air-regeneration system This factor automatically maintains the Hypoxic Threshold (or a lower level of oxygen in a breathable range) in a hermetic artificial atmosphere being maintained at constant barometric pressure.

Figure 26:
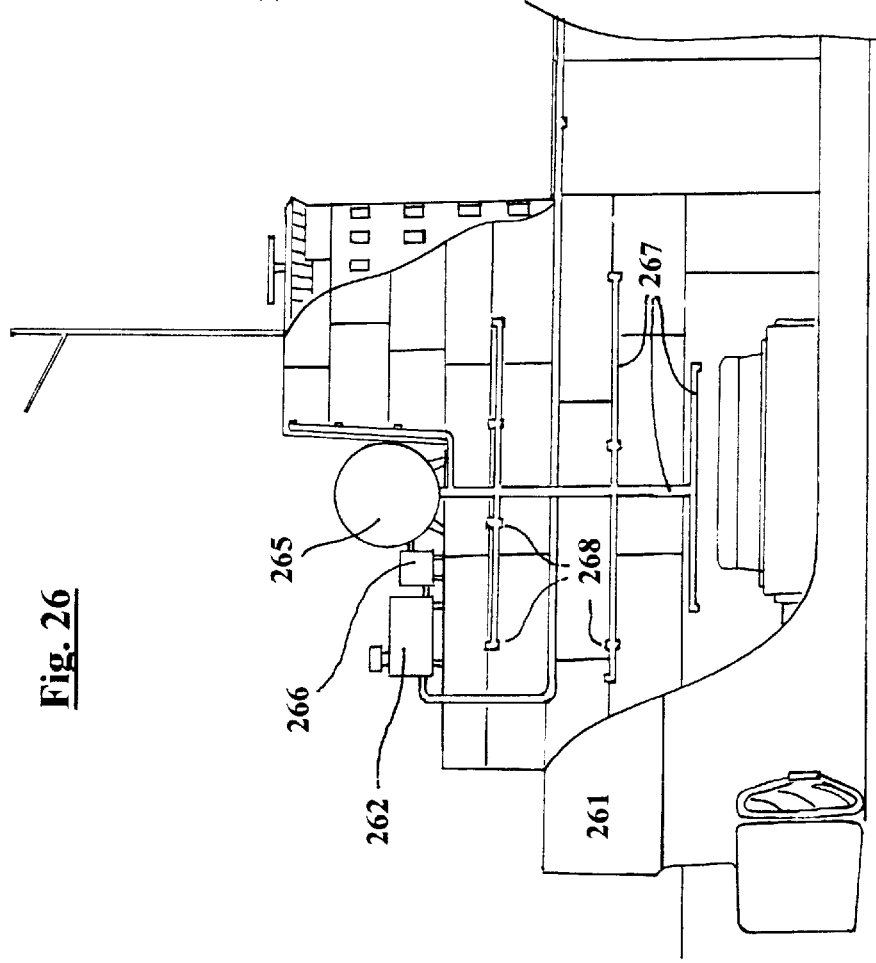
FIG. 26 presents a schematic view of the Marine Fire-PASS system for use in marine vessels, e.g. tankers, cargo, cruise ships, or military vessels.

FIG. 26 presents a schematic view of a marine vessel 261 such as a tanker, a cargo ship, a cruise ship or a military vessel. A ship cannot be completely protected by a fire-preventive atmosphere, as some rooms must be frequently ventilated with normoxic air. Consequently, the Marine FirePASS must be installed in dual mode. The Fire Pass (operating in its suppression mode) can protect rooms that are frequently opened and/or ventilated. The following is a brief list of the appropriate operating mode of operation in a given area:

fire-suppression circuit (e.g. machine and upper deck personnel rooms)

fire-prevention circuit (e.g. liquid or dry cargo area, arsenal, computer center and hardware storage rooms on board of a military vessel)

The Marine FirePASS consists of a hypoxic generator 262 that takes in ambient air, and supplies the breathable hypoxic fire-preventive composition through the fire-prevention circuit 263. Discharge nozzles 264 are located in each cargo or military hardware compartment. The system constantly maintains a fire-preventive atmosphere through the continuous supply of air with oxygen content below the Hypoxic Threshold. Excessive air exits through simple ventilation openings or pressure equalization valves (not shown).

The fire-suppression circuit of the Marine FirePASS consists of a high-pressure container 265, a compressor 266 and distribution piping 267. Nozzles 268 are located in each room, plus any additional areas covered by the circuit.

Figure 27:
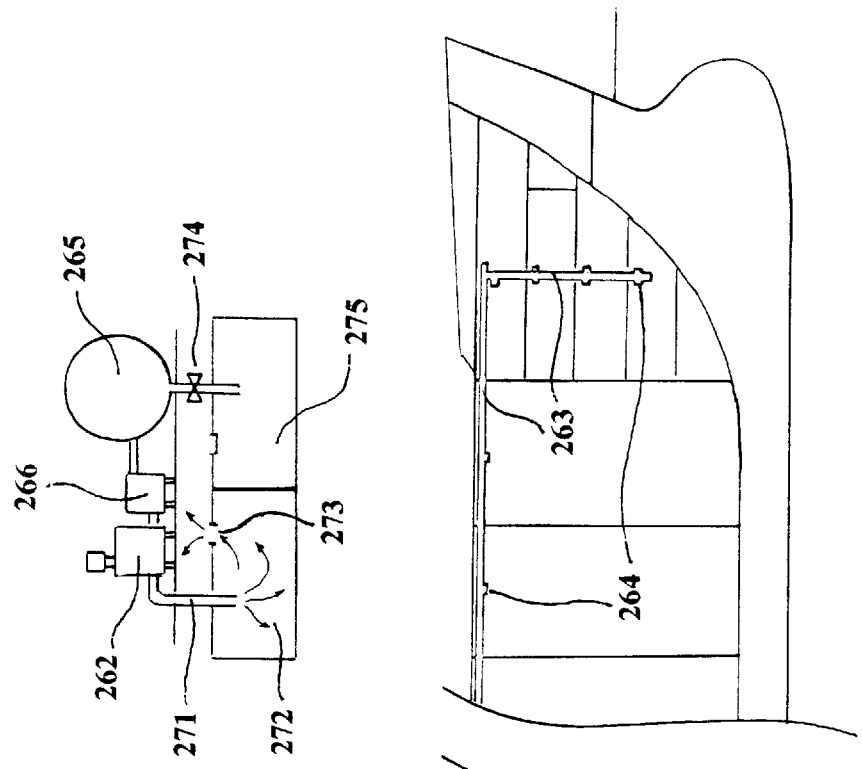
FIG. 27 illustrates the working principle of the Marine FirePASS.

The working principle of the Marine FirePASS is shown schematically on FIG. 27. The generator 262 takes in ambient air, extracts oxygen, and then supplies the oxygen-depleted fraction to the fire-preventive circuit 271. The covered area 272 is constantly ventilated with fresh hypoxic air that exits the protected environment 272 through a ventilation hole 273.

The fire-suppressive composition is maintained under high pressure by a compressor 266 in a storage container 265. In case of fire, an electro-explosive initiator described earlier actuates a release valve 274. This causes the hypoxic fire-suppressive composition from the container 265 to replace (or dilute) the atmosphere in the fire-suppression circuit area 275. Consequently, a breathable fire-suppressive atmosphere with an oxygen content under the Hypoxic Threshold (preferably between 10% and 14%) is established throughout the circuit.

Advanced Aircraft Fire Suppression System

The Aircraft Fire Suppression System (AFSS) described in the rest of this document represents a cost-effective, highly reliable and practical solution to the fire suppression problem on board any aircraft, especially present-day passenger airplanes that require pressurization at 2–3 km altitude, which represents a modification of the embodiment shown earlier on FIG. 21.

Figure 28:
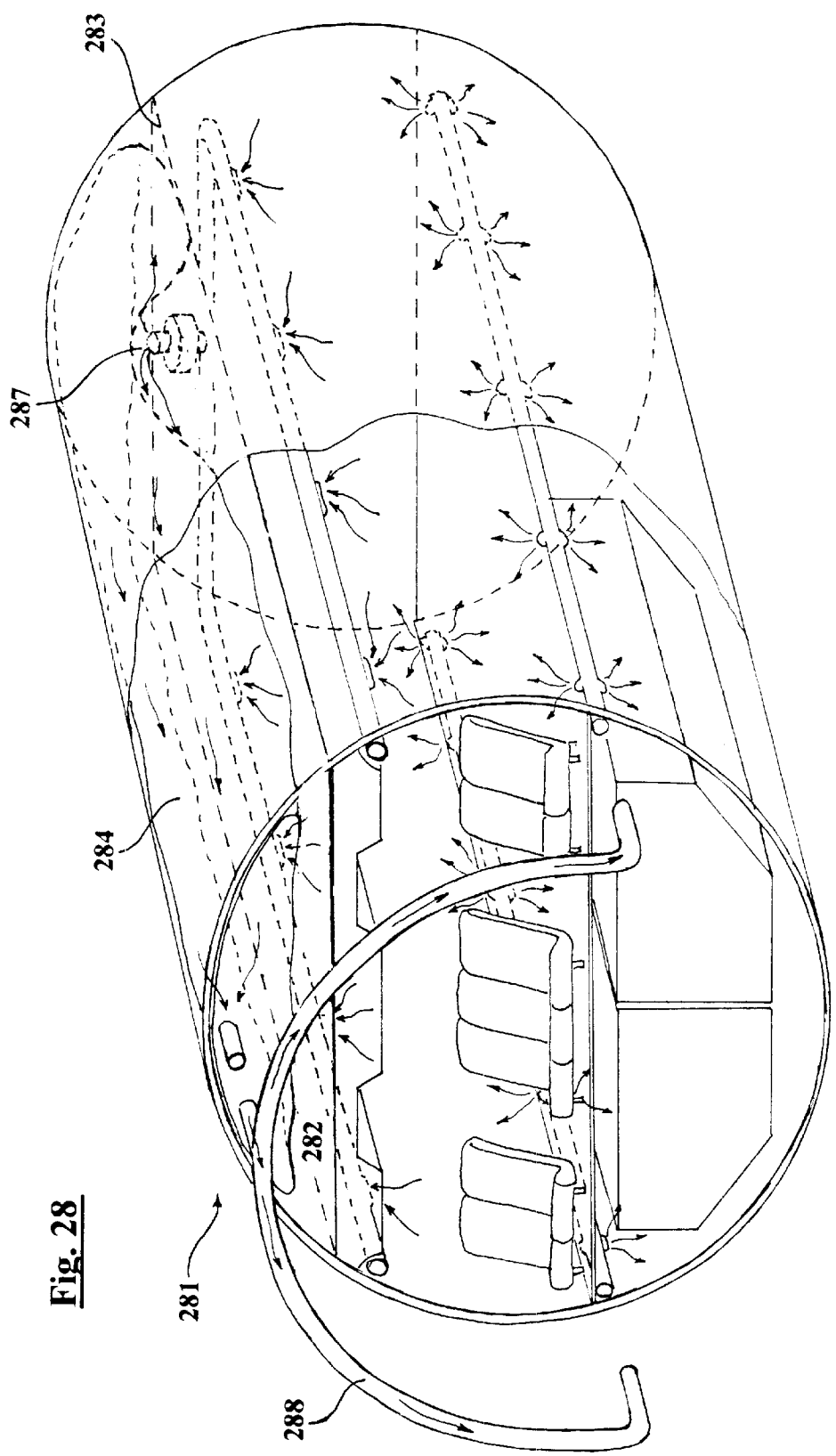
FIG. 28 shows the implementation of Aircraft Fire Suppression System into aircraft cabin design.

FIG. 28 shows a schematic cross-sectional view of a passenger aircraft cabin 281 having AFSS (Aircraft Fire Suppression System) gas agent storage container 282 installed in the upper body lobe behind the ceiling.

Some aircraft designs do not provide enough space for installing container 282 in the upper body lobe. In such cases container 282 may be installed in the lower body lobe or anywhere in the aircraft body. Container 282 may have any form and appearance—it may be installed in multiple quantities as insulation panels under the aircraft's skin. For an existing aircraft, in order to reduce the cost of the conversion, it can be installed in one of the standard airfreight containers that fit in the aircraft's cargo bay.

The most preferred embodiment of the container 282 consists of a light rigid plastic, metal or composite skin 283 containing inside a soft inflatable gas storage bag 284 made from a thin and lightweight synthetic or composite material. During normal aircraft operation storage bag 284 is inflated and contains under minor pressure a breathable fire suppressive agent consisting of hypoxic (oxygen-depleted) air with an increased carbon dioxide content. Using more accurate terminology, the AFSS fire suppression agent consists of a mixture of oxygen, nitrogen and carbon dioxide with possible addition of other atmospheric gases, wherein nitrogen can be replaced in part or completely with an other inert gas or gas mixture.

The oxygen content in the breathable hypoxic fire-suppression atmosphere of the pressure cabin after the fire suppression agent being released must be below Hypoxic Threshold of 16.8%, and preferably in the range from 14%–16% (depending on the pressurization level inside aircraft) or lower for some special cases described further below. The carbon dioxide content in this internal atmosphere should be approximately 4–5%. The rest of the gas mixture (79%–82%) consists of nitrogen and other atmospheric gases.

Figure 29:
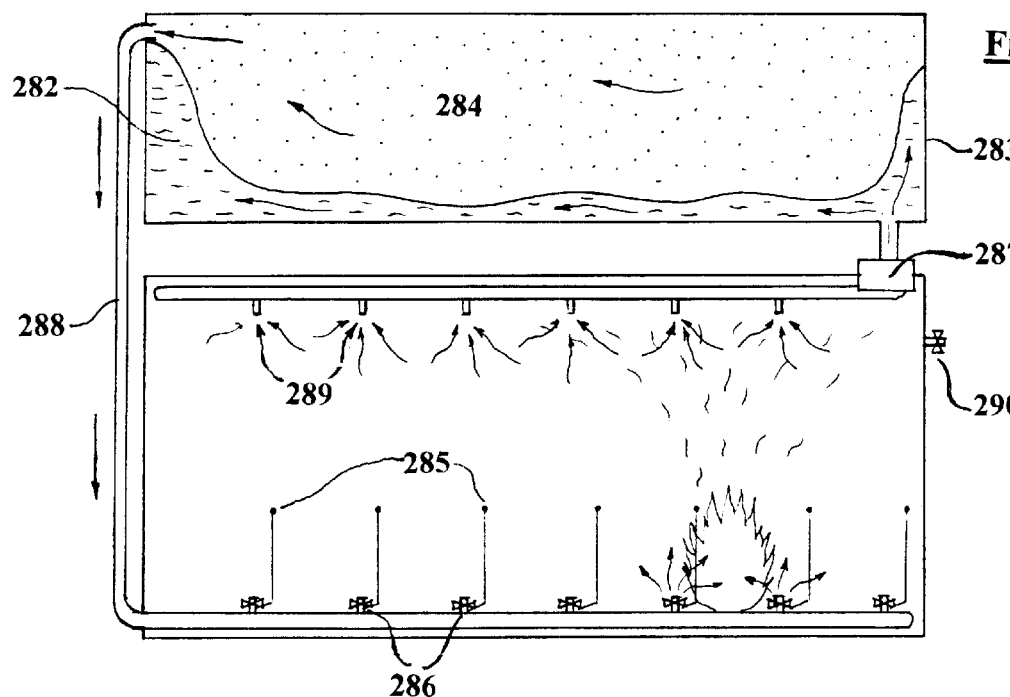
FIGS. 29, 30, 31 and 32 illustrate schematically the working principle of the AFSS.

FIG. 29 illustrates schematically the working principle of the AFSS that is tied directly to smoke or thermal detectors 285 distributed throughout the pressure cabin 281. A signal from a detector 285 opens a local automatic release valve 286 (or all at once, if desired) and is also transmitted to the main control panel, which automatically turns on blower 287 that operates the AFSS. In order to increase reliability of the system, a signal from any detector 285 should open all release valves 286. However, in some cases, a detector 285 that detects fire or smoke first may open only a local valve or group of valves 286.

The opening of release valves 286 results in the rapid introduction of the hypoxic fire suppression agent from storage bag 284 into pressure cabin 281. At the same moment a high efficiency blower 287 sucks up air contaminated with smoke from the cabin through the air-collecting system 289 and pressurizes it in container 282 deflating bag 284 completely and forcing all amount of the hypoxic fire agent out of the bag 284 and into cabin 281, via conduit 288 and release valves 286.

As an option, in order to remove traces of smoke and other pyrolysis products from the cabin air, the air-collecting system 289 operated by blower 287 may continue to operate even after bag 284 is completely deflated. In this case the pressure inside container 282 will rise until a certain value controlled by an optional relief valve (not shown here) releasing excessive gas mixture into outside atmosphere.

During normal aircraft operations, container 282 communicates with pressure cabin 281 through the blower 287, which allows equalizing its pressure during a flight.

It is recommended that hypoxic agent should be released into all cabin accommodation simultaneously. However, in order to reduce the size of container 282, the release of hypoxic fire agent can be limited to the space in which smoke or fire was detected. Given AFSS's reaction time of less than one second, this should be more than sufficient to suppress a localized fire. If needed, pressure cabin 281 can be also separated into different sections by dividing curtains as described in embodiments shown on FIGS. 11, 15 and 16.

Discharge nozzles 286 are equipped each with a release valve having an electrical or electro-explosive initiator. Manual operation is also possible in case of power failure—a crewmember can pull open the nearest release valve, if needed. Suitable solenoid or burst disk-type valves, initiators and detectors are available from a number of fire equipment suppliers.

Relief valve 290, generally installed in an aircraft, provides a guarantee that the barometric pressure inside cabin 281 will be maintained within safety limits during release of the hypoxic fire-extinguishing agent. It is necessary to shut down the ventilation system (not shown here due to its complexity) of the cabin 11 when AFSS is initiated. The ventilation system can be turned on again after 5–10 minutes, which is more than enough to detect the suppressed fire source and prevent it from reigniting.

Figure 30:
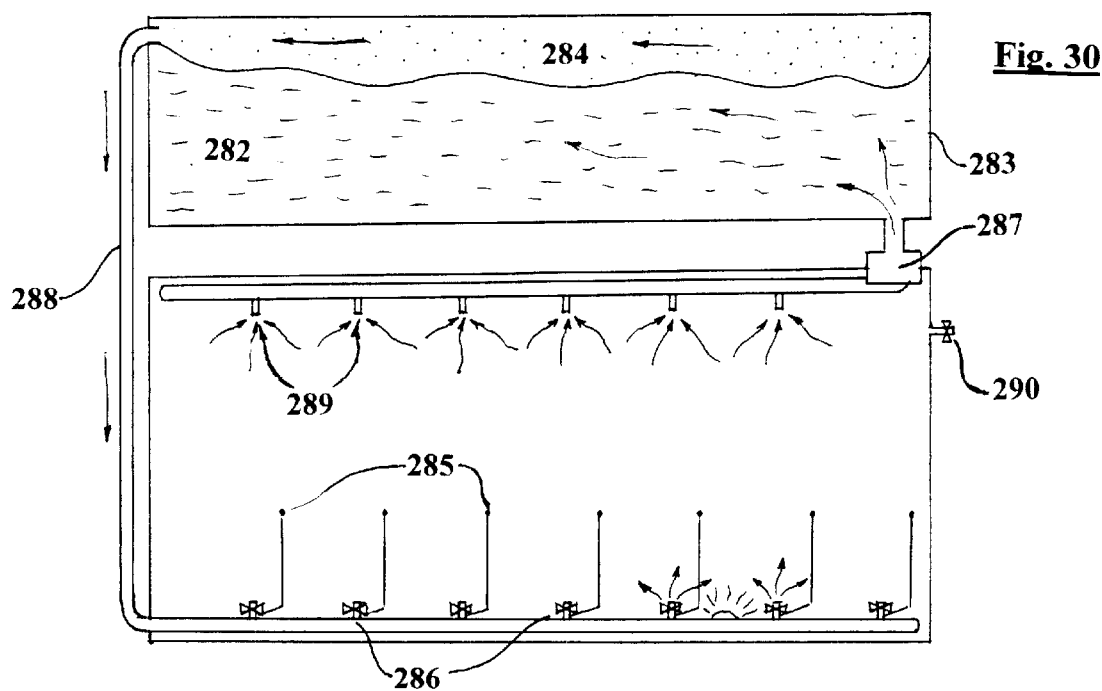

While FIG. 29 shows the AFSS at the beginning of the deployment, the FIG. 30 shows the same embodiment close to the end, when gas storage bag 284 is almost deflated and the fire extinguished.

Figure 31:
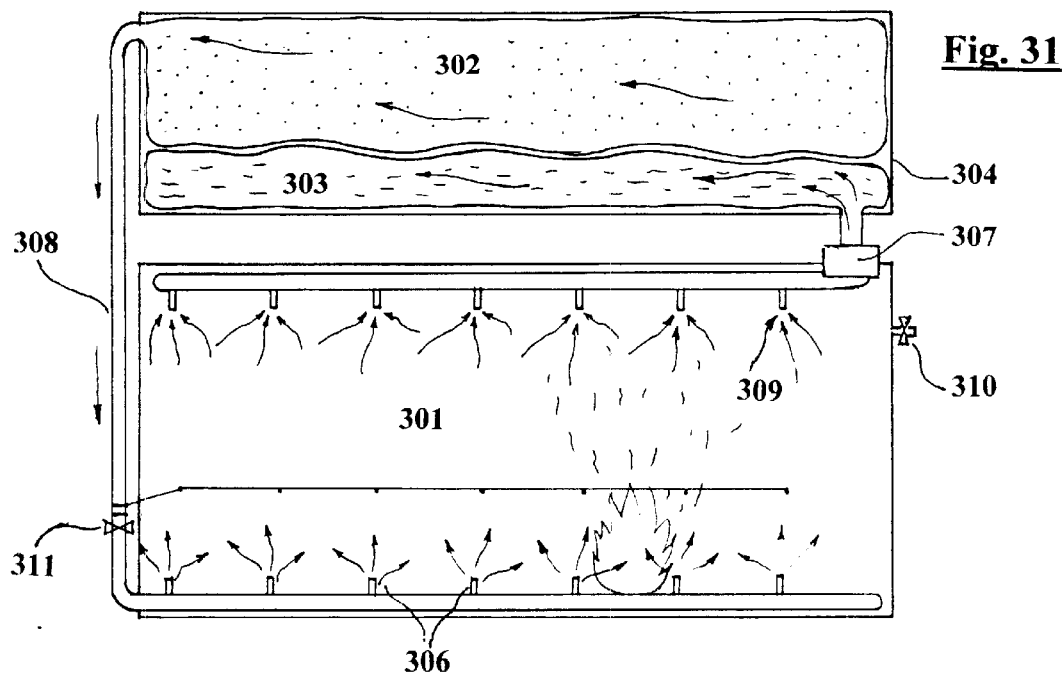
Figure 32:
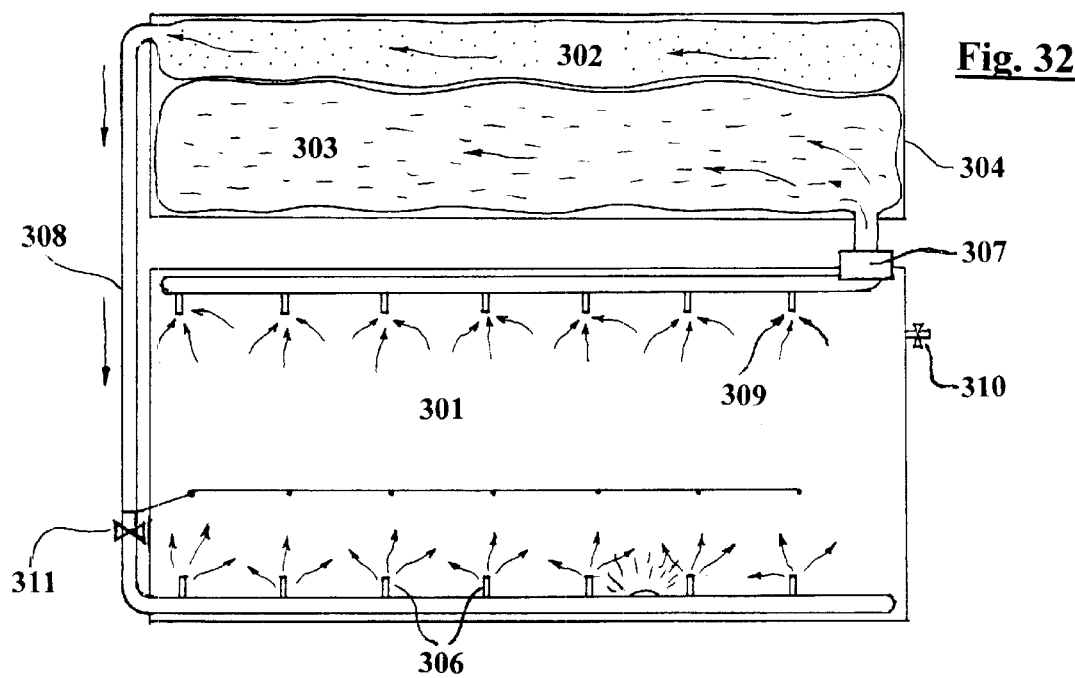

In order to simplify the AFSS, the local discharge nozzle valves 286 may be replaced just by one main valve in the upper portion of the delivery piping 288 as shown on FIG. 31 and 32.

The embodiment presented on FIG. 31 and 32 shows the same solution, but using two inflatable bags 302 and 303 installed in a non-airtight container or frame 304 that is only needed in order to hold both bags in place. When AFSS is deployed, the blower 307 pumps air from the cabin 301 inside bag 303 that is initially deflated. While inflating, the bag 303 applies pressure on bag 302 that already starts discharging the hypoxic fire-suppressive agent through valve 311 and nozzles 306. Valve 311 opens by a signal from fire/smoke detectors 305 or manually by a crewmember. Inflating bag 303 will completely deflate bag 302 allowing all the gas out of the system. Pressure relief valve 310 will guarantee desired pressure in cabin 301.

The breathable fire-suppressive agent should be available on board of the aircraft in an amount sufficient for a complete air exchange in the cabin, if possible. The initial oxygen content in the fire agent and its storage pressure in bag 14 may vary. This depends on the storage space availability on board of aircraft. In any case these parameters are calculated in such a way that when the fire agent is released, it will provide a fire-suppressive atmosphere on board with an oxygen content of about 15%. The gas storage pressure may vary from the standard atmospheric up to 2–3 bar or even higher.

Once the AFSS is deployed, the cabin's fresh air supply system must be automatically shut down. It is also recommended not to use it during the remainder of the flight. This will allow retaining the fire-extinguishing atmosphere in case the fire resumes, which usually happens during electrical incidents. Fresh air may be added in exact controlled amounts in order to keep the oxygen content in the cabin atmosphere between 15% and 16%

The hypoxic fire-extinguishing agent may be generated in flight, if needed, by an on-board hypoxic generator manufactured by Hypoxico Inc., or a cryogenic air separation device that can liquefy atmospheric air and extract oxygen in a centrifuge. Aircraft engines of the future that can provide cleaner combustion process can consume the extracted oxygen. Ground service vehicle 222 shown on FIG. 22 can refill the system. This vehicle is equipped with a hypoxic generator and cylinders with stored carbon dioxide. The working principle of the hypoxic generator is explained entirely earlier in this document and in the previous patent applications provided above. Vehicle 222 provides ground service on AFSS and, if needed, refilling of the system with breathable fire-extinguishing composition. This composition consists of a mixture of hypoxic air gases generated at site from ambient air and carbon dioxide added to the mixture. Hypoxic generator utilizes the molecular-sieve adsorption technology that allows extracting a precise part of oxygen from ambient air and providing oxygen-depleted air with exact oxygen content. The concentration of oxygen in the fire-extinguishing composition may vary from 16% down to 1% or even lower, and is always predetermined so that when released, the atmosphere in the aircraft's cabin will contain approximately 15% of oxygen (may be lower for military vehicles).

Hypoxic atmosphere with a 15% oxygen content at barometric pressure of 2.5 km is absolutely safe for general public (even without supplemental oxygen) for the time needed to localize and control the fire source (at least 15 minutes) or for the aircraft to descend to a lower altitude, which will increase barometric pressure on board and counterbalance effect of hypoxia.

However, the addition of only 4–5% of carbon dioxide to the hypoxic gas mixture will allow retaining a fire-suppressive hypoxic atmosphere for hours without negative side effects on passengers' health.

Figure 33:
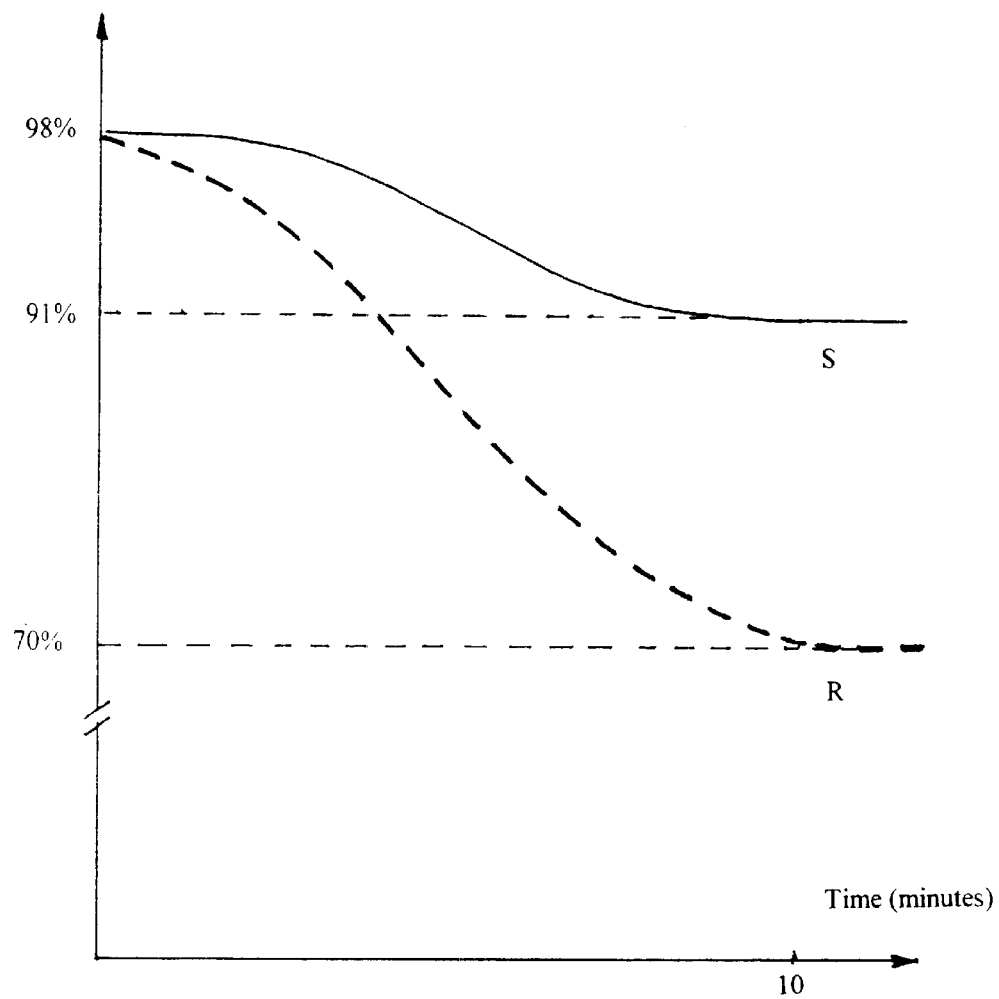
FIG. 33 illustrates the variance in oxyhemoglobin's saturation at 10% O2 in inspired air containing ambient atmospheric CO2 concentration in one case and increased up to 4% CO2 content in another case.

The diagram presented on FIG. 33 illustrates the variance of hemoglobin's oxygen saturation with as it relates to the drop in oxygen content in inspired air from ambient 20.9% to 10% under the following two conditions:
 a) At ambient atmospheric carbon dioxide content of 0.035% and
 b) At increased carbon dioxide content of 4%

This illustration is confirmed by the results of an extensive research "CO2—O2 Interactions In Extention Of Tolerance To Acute Hypoxia" conducted for NASA in 1995 by University of Pennsylvania Medical Center (Lambertsen, C. J.)

Curve R illustrates a drop in arterial oxyhemoglobin saturation from 98% to the level of about 70% during exposure to 10% O2 in the inspired air having ambient atmospheric carbon dioxide content.

Curve S represents physiological response to restored normocapnia in hypoxia when 4% CO2 was added to the inspired hypoxic gas mixture having 10% O2. It clearly shows the effectiveness of carbon-dioxide-induced acute physiologic adaptation to hypoxia.

According to the NASA research report: ". . . carbon dioxide can increase brain blood flow and oxygenation, by dilating brain blood vessels. This increased blood (oxygen) flow provides an acute, beneficial adaptation to otherwise intolerable degrees of hypoxia"

"In hypoxic exposures, an increase in arterial carbon dioxide pressure can sustain brain oxygenation and mental performance."

All this confirms that an addition of 4–5% CO2 to the breathable hypoxic fire-extinguishing agent can provide guarantee that the use of such agent onboard of an aircraft is absolutely safe. Moreover, a number of researchers confirm that exposure to such hypercapnia level continuing for many days does not provide any harm to the human organism.

Figure 34:
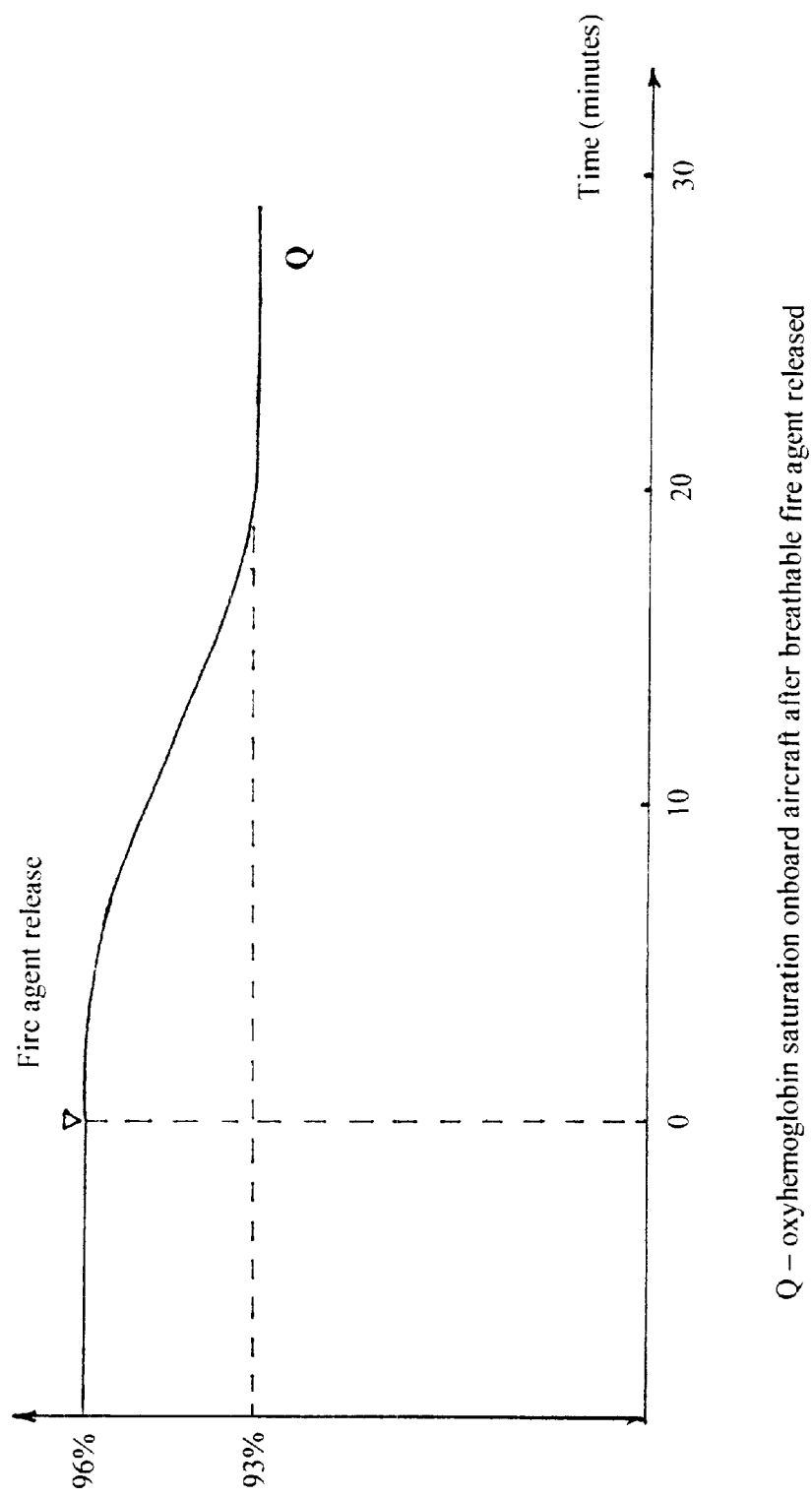
FIG. 34 shows a diagram representing an average physiological response to the exposure to the invented breathable hypoxic fire-suppressive agent at altitude of 2.5 km or onboard of modern passenger aircraft.

FIG. 34 shows a diagram representing an average physiological response to the exposure to the invented breathable hypoxic fire-suppressive composition at an altitude of 2.5 km, which corresponds to the barometric pressure on board a modern passenger aircraft due to its pressurization at this altitude.

During flight, an average oxygen saturation of hemoglobin is about 96%. After about 20 minutes following the release of the breathable hypoxic fire-suppressive gas mixture, the arterial oxyhemoglobin saturation may drop on average to 93%, as shown by curve Q on the diagram, provided that the gas mixture contains about 15% O2 and 4% CO2. Such an insignificant drop in oxyhemoglobin saturation can be observed during a moderate exercise at sea level, which is absolutely safe.

The AFSS allows maintaining hypoxic fire-retarding environment during the rest of the flight, if needed, by simply keeping the fresh-air-intake and ventilation systems of the pressure cabin off. Fresh air can be added automatically in limited amounts in order to maintain oxygen content inside the aircraft cabin at a level of about 16%. Such automatic system can be easily built by implementing an oxygen transducer.

At the present time new composite materials have allowed stronger and lighter aircraft to be designed without the need for reducing interior atmospheric pressure by pressurizing at higher altitudes. Such airplanes will provide a standard atmospheric pressure on board during the flight and can also handle a slight increase in internal pressure. A deployment of the AFSS on board of such aircraft will induce an average drop in arterial oxyhemoglobin from 98% to about 95%, which would be hardly noticeable by a passenger.

The invented Hypoxic FirePASS, AFSS and breathable hypoxic fire-extinguishing compositions can be employed in any enclosed human occupied space, including but not limited to: rooms for data processing, telecommunication switches, process control and Internet servers, banks/financial institutions, museums, archives, libraries and art collections, military and marine facilities, passenger/military aircraft, space vehicles/stations, underground/underwater facilities; marine vessels; facilities operating with inflammable/explosive materials, nuclear power plants, transportation tunnels and vehicles, apartment and office complexes, hospitals, private homes and other isolated human-occupied objects for living, working, travel, sport, entertainment and further human activities. More information will be provided on the Internet at: www.firepass.com.

What is claimed is:

1. A fire-extinguishing system utilizing breathable fire-extinguishing compositions in enclosed human-occupied spaces, said system comprising:

a device for releasing a gas mixture containing oxygen and nitrogen; said gas mixture containing less than 18% of oxygen for permanent use as a fire-preventive atmosphere;

said gas mixture containing less than 16.8% of oxygen for episodic use as a fire suppression agent;

said device having means for communicating with an enclosed human-occupied space and admitting said gas mixture therein in order to create a breathable hypoxic atmosphere that does not support combustion or ignition, but is suitable for human respiration.

2. The system according to claim 1, wherein said gas mixture completely or partly replaces air in human-occupied space creating a steady breathable fire-preventive atmosphere having oxygen content above 12% and nitrogen content below 88%, wherein nitrogen can be replaced entirely or in part by other inert gas or gas mixture;

said breathable atmosphere containing water vapors, carbon dioxide and other atmospheric gases in quantities acceptable for breathing;

said device supplying said gas mixture constantly in amounts sufficient for ventilation of said human-occupied space in order to maintain breathing quality of the atmosphere;

said device being employed for fire prevention applications in human-occupied enclosed spaces, including but not limited to: an aircraft, space station or space vehicle, marine vessels, underwater or underground facilities and vehicles, transportation tunnels and other isolated or enclosed human-occupied objects for living, working, transportation, sport, entertainment and further human activities.

3. The system according to claim 1, wherein said fire suppression agent having nitrogen content below 99.9%; the exact content and volume are calculated in such a way that when the fire agent is released, it mixes with internal atmosphere in said enclosed human-occupied space providing breathable fire-suppressive atmosphere with an oxygen content in a range from 10% to 16% or lower, if needed;

said device being employed for fire suppression applications in human-occupied enclosed spaces, including but not limited to: an aircraft, space station or space vehicle, marine vessels, underwater or underground facilities and vehicles, transportation tunnels and other isolated or enclosed human-occupied objects for living, working, transportation, sport, entertainment and further human activities.

4. The system according to claim 3 wherein said fire suppression agent containing sufficient amount of carbon dioxide for counterbalancing hypoxia in human body, so when the fire suppression agent is released, it will provide a breathable fire-suppressive atmosphere with oxygen content in a range from 10% to 16% and carbon dioxide content achieving up to 5%–10%.

5. The system according to claim 1 wherein said device being an apparatus (132) for extinguishing or preventing fires in a surface-mounted receptacle or in a storage receptacle tank (130) which may contain a supply of inflammable fluid; said apparatus being movable and structurally independent of the receptacle;

said apparatus constantly supplying a breathable fire-extinguishing composition inside said receptacle allowing user to perform welding and other repair work inside.

6. A fire-extinguishing system for providing breathable fire-preventive atmosphere in enclosed human-occupied spaces, said system comprising:

a gas release apparatus for providing a breathable fire-extinguishing composition with oxygen content below 18%, communicating with an enclosing structure having an internal environment (11, 91, 101, 110, 130, 140, 171, 191, 221, 241, 251, 272) therein and an entry (12, 131, 172, 192);

said apparatus constantly ventilating said enclosing structure with said composition, newly generated by an oxygen-extraction device (20, 50, 92, 102, 111, 132, 143, 173, 193, 262) or regenerated by a life-support system (223, 232, 242, 252).

7. The system according to claim 6, wherein said oxygen-extraction device (20, 50, 92, 102, 111, 132, 143, 157, 173, 193, 262) having an inlet (21, 51, 93, taking in an intake gas mixture and first (22, 53) and second (23, 52, 94, 105, 113, 145, 174, 194, 271) outlets, said first outlet transmitting a first gas mixture having a higher oxygen content than the intake gas mixture and said second outlet transmitting a second gas mixture having a lower oxygen content than the intake gas mixture;

said second outlet communicating with said internal environment and transmitting said second mixture into said internal environment so that said second mixture mixes with the atmosphere in said internal environment;

said first outlet transmitting said first mixture to a location where it does not mix with said atmosphere in said internal environment;

said internal environment selectively communicating with the outside atmosphere and emitting excessive internal gas mixture into the outside atmosphere;

said intake gas mixture being ambient air taken in from the external atmosphere outside said internal environment.

8. The system according to claim 7 and said oxygen-extraction device employing molecular-sieve adsorption technology (20) in order to extract part of oxygen from said intake gas mixture.

9. The system according to claim 7 and said oxygen-extraction device employing oxygen-enrichment membrane (50), cryogenic or other air separation technology in order to extract part of oxygen from said intake gas mixture.

10. The system according to claim 7 and said second outlet additionally communicating with a high-pressure storage container (97, 104, 112, 153, 265) for providing sufficient supply of said second gas mixture that can be released into said internal environment in order to suppress possible fire when said internal environment does not initially contain said second gas mixture.

11. The system according to claim 6, wherein said life-support system having an air-regeneration module that removes excessive moisture, carbon dioxide, dust and other gaseous products of human activity from said breathable fire-extinguishing composition;

said regeneration module constantly receiving said breathable fire-preventive atmosphere from said internal environment, replacing excessive carbon dioxide with oxygen and providing said breathable fire-extinguishing composition in amounts necessary to maintain breathing quality of said atmosphere;

said breathable atmosphere and composition containing a permanent ballast of nitrogen or other inert gas in a range from 83% to 88% being introduced therein initially in necessary amount that can not be affected by said regeneration module; said ballast automatically preventing oxygen content from rising above 17%.

12. The system according to claim 6 wherein said breathable fire-preventive atmosphere being recycled by a split air-conditioning system (14) in order to control its temperature and humidity inside said human-occupied space.

13. A fire extinguishing system for providing a breathable fire-suppressive atmosphere in enclosed human-occupied areas, said system comprising:

a gas storage container (97, 104, 108, 112, 122, 153, 202, 214, 265, 284, 302) holding a hypoxic fire suppression agent containing oxygen in a range below 16% and nitrogen; said agent may contain carbon dioxide and other atmospheric gases;

said container installed in or communicating with an enclosing structure having internal environment (91, 101, 110, 140, 151, 201, 211, 275, 281, 301) therein containing internal atmosphere ambient for its location and purpose, and an entry communicating with said internal environment;

the amount of said agent detained in or released from said container being calculated so that when the agent is released into said enclosed space, it provides a breathable fire-suppressive atmosphere having an oxygen concentration in a range from 10% to 16% and an optional content of carbon dioxide under 10%.

14. The system according to claim 13 and said gas container containing said agent at a high barometric pressure, preferably above 10 bar, and releasing it when a signal from a fire and smoke detecting equipment (98, 125, 159, 285, 305) is received;

said container having a release valve (107, 123, 274, 286, 311) actuated by an initiator activated by said signal;

said container having gas release nozzles (95, 106, 114, 146, 154, 175, 195, 204, 213, 268, 306) connected directly or through optional gas distribution piping (94, 105, 109, 113, 145, 152, 174, 194, 203, 212, 267, 288, 308);

said nozzles having an optional noise-reducing device in order to reduce a level of the sound from the agent release.

15. The system according to claim 13 and said container (97, 104, 112, 153, 265) being installed in combination with an oxygen-extraction device (92, 102, 111, 157, 262) and receiving said gas agent from it, the agent being constantly maintained under selected barometric pressure by said device and/or intermediate high-pressure compressor (103, 158, 266).

16. The system according to claim 13 and said container being an autonomous freestanding container (121, 202, 214) having an individual fire and/or smoke detection system that initiates release of said gas agent from said container in case of fire.

17. The system according to claim 11 said enclosing structure with said internal environment therein being an area selected from the group consisting of, but not limited to: rooms and enclosures for data processing and process control equipment, telecommunication switches and Internet servers; banks and financial institutions, museums, archives, libraries and art collections; dwellings and office buildings; military and marine facilities; aircraft, space vehicles and space stations, marine and cargo vessels; industrial processing and storage facilities operating with inflammable and explosive materials and compositions and other industrial and non-industrial facilities and other objects that require fire safety in human-occupied environments.

18. An automatic fire extinguishing system for providing breathable fire-suppressive atmosphere for transportation and communication tunnels, industrial and non-industrial buildings and structures, said system comprising:

an oxygen-extraction device (20, 50, 111, 157) having an intake and first and second outlets, said device taking in ambient air through said intake and emitting a reduced-oxygen gas mixture, having a lower concentration of oxygen than ambient air, through said first outlet and enriched-oxygen gas mixture, having a greater concentration of oxygen than ambient air, through said second outlet; said device communicating with an interior space (110, 151) restricted by a wall structure having an entry and exit, and multiple isolating partitions (115, 155) defining selected segments (A, B, C, D) of the interior space; said isolating partitions being selectively closable in case of fire so that when closed, the segments are substantially isolated from each other and the outside environment;

a gas storage container (112, 153) having receiving conduit and distribution conduit (113, 152) and containing said reduced-oxygen gas mixture under higher than ambient barometric pressure, said receiving conduit being operatively associated with said first outlet and receiving said reduced-oxygen gas mixture after intermediate compression therefrom;

said distribution conduit communicating with said interior space so that the reduced-oxygen gas mixture is emitted in case of fire from said container into one or multiple segments inside said interior space;

said second outlet communicating with the outside atmosphere and releasing said enriched oxygen mixture into the outside environment;

said reduced oxygen gas mixture having oxygen concentration below 16%;

said reduced oxygen gas mixture, being released inside selected segments of said interior space in case of fire and providing a breathable fire-suppressive composition with oxygen content ranging from 12% to 16%;

said composition emitting from said interior space in amounts necessary to equalize atmospheric pressure inside said interior space with the outside atmospheric pressure.

19. The system according to claim 18 and said multiple isolating partitions being inflatable drop curtains normally kept deflated and folded in curtain holders (116, 156) installed under ceiling throughout the interior space;

said drop curtains being made of a clear and soft synthetic material in form of inflatable flaps so when inflated, they provide a sufficient obstruction for the draft or any substantial air movements into selected segments;

said curtains being inflated by a gas from a pyrotechnical device or container initiated by a signal from the fire-detecting equipment.

20. The system according to claim 18 and said interior space being selected from the group comprising of rooms, houses and buildings, transportation tunnels and vehicles, underground and underwater facilities, marine vessels, aircraft, military installations and vehicles, nuclear power plants, and other industrial and non-industrial human occupied objects.

21. An automatic fire extinguishing system for providing a constant breathable fire-preventive hypoxic atmosphere for transportation and communication tunnels, industrial and non-industrial buildings and structures, said system comprising:

a gas processing device (20, 50, 92, 102, 132, 143, 173, 193, 262) having an intake and first and second outlets, said device taking in ambient air through said intake and emitting a reduced-oxygen gas mixture, having a lower concentration of oxygen than ambient air, through said first outlet and enriched-oxygen gas mixture, having a greater concentration of oxygen than ambient air, through said second outlet;

said gas processing device communicating with an enclosed space (91, 101, 130, 171, 191, 272) comprising an entry, exit and a wall structure defining said enclosed space; said entry and exit having doors (131, 148, 172, 192) being selectively closable so that when closed, the enclosed space is substantially isolated from the outside environment;

said first outlet communicating with a gas distribution piping (94, 105, 145, 174, 194, 263, 271) having multiple discharge nozzles (95, 106, 146, 175, 195, 264) inside the enclosed space so that reduced oxygen gas mixture is transmitted into said enclosed space;

said reduced oxygen gas mixture having oxygen content below 17% and above 12%;

said gas processing device comprising an air pump (24), receiving ambient air through the intake (21, 51) from the outside atmosphere, and an oxygen-extraction module (20, 50) receiving compressed air from the pump, said oxygen-extraction module having a reduced oxygen mixture conduit (23, 52) and an enriched oxygen mixture conduit (22, 53);

said first outlet being operatively associated with said reduced oxygen mixture conduit and receiving said reduced oxygen gas mixture therefrom, said second outlet being operatively associated with said enriched oxygen mixture conduit and receiving said enriched oxygen gas mixture therefrom and releasing said mixture into the outside environment;

said reduced oxygen gas mixture emitting from said enclosed space in amounts necessary to equalize atmospheric pressure inside said space with the outside atmospheric pressure.

22. The system according to claim 21 and said enclosed space being selected from the group comprising of computer rooms, houses and buildings, transportation and communication tunnels, nuclear power plants, underground and underwater facilities, marine vessels, and other non-hermetic human occupied objects;

said oxygen extraction module may employ gas adsorption, membrane separation or cryogenic separation technologies.

23. A fire extinguishing apparatus for providing a breathable fire-extinguishing composition for human occupied environments, said apparatus comprising:

a compressor (24) and an air separation device (20, 50) having an intake (21, 51) and first (23, 52) and second outlets (22, 53), said device taking in compressed air provided by said compressor through said intake and emitting a reduced-oxygen gas mixture having a lower concentration of oxygen than said gas mixture through said first outlet and enriched-oxygen gas mixture having a greater concentration of oxygen than said gas mixture through said second outlet;

said intake being connected to a distribution valve (27, 47) providing distribution of compressed air to multiple inlets (28, 48) communicating each with an individual separation container (29) filled with a molecular sieve material that under pressure adsorbs nitrogen and water vapors, allowing enriched-oxygen gas mixture to pass through into a gas collecting tank (31) communicating with said second outlet and being operatively associated with all said separation containers and receiving said enriched-oxygen gas mixture therefrom;

each said separation container being pressurized and depressurized in cycling manner and releasing during each depressurization cycle said reduced-oxygen gas mixture being delivered into said first outlet.

24. The apparatus according to claim 23 and said second outlet having release valve (32) allowing to keep said enriched-oxygen gas mixture being collected in said gas collecting tank (31) under increased atmospheric pressure, so when any of said separation containers depressurizes, a portion of said enriched-oxygen gas mixture is released from said tank back into said container purging said molecular sieve material from remaining nitrogen and water;

said distribution valve (27, 47) being air distribution device selected from the group consisting of electrical, mechanical, air piloted and solenoid valves, both linear and rotary configuration, with actuators controlled by pressure, mechanical spring, motor and timer;

said distribution valve being mounted on a manifold (28, 48) that is selectively communicating with said multiple separation containers (29) and said first outlet, and selectively allowing periodic access of pressurized air inside said containers and exit of said reduced-oxygen gas mixture therefrom.

25. A fire-extinguishing system for a human-occupied hermetic object, said system, designed for automatically maintaining a breathable fire-preventive composition onboard, comprising:

an initial introduction of said composition containing oxygen and nitrogen into said hermetic object (221, 241, 251), said introduction provided by an oxygen-extraction apparatus (222) directly or via an intermediate gas storage container, so when said composition completely replaces air inside said object and an internal atmosphere is created, the object being sealed and further air regeneration being provided by an on-board life-support system (223, 232, 242, 252);

said composition and internal atmosphere containing an inert gaseous ballast, preventing oxygen content from rising above 16.8%;

said ballast being inert gas, preferably nitrogen, that is constantly present in said internal atmosphere in a concentration of minimum 83.2%;

said composition and internal atmosphere having oxygen concentration in a range below 16.8% and preferably above 14%;

said life-support system maintaining constant barometric pressure on board and regenerating said internal atmosphere by removing excessive carbon dioxide and providing desired level of oxygen and humidity without affecting the inert ballast content in any way.

26. The system according to claim 25 and said hermetic object being selected from a group comprising: an aircraft, space station or space vehicle, submarine, military vehicles and facilities, underwater or underground facilities, and other isolated human-occupied objects for living, working or transport.

27. An automatic fire-extinguishing system for providing a breathable fire-suppressive atmosphere on board of an aircraft, said system comprising:

a storage and release system for a hypoxic fire suppression agent; said storage and release system having a storage container (214, 284, 302) that contains said fire suppression agent under pressure and communicates with the aircraft interior or pressure cabin (211, 281, 301) through a gas distribution piping (212, 288, 308) restricted by discharge valves (286, 311) and gas release nozzles (213, 286, 306);

said fire suppression agent being a mixture of oxygen, nitrogen and carbon dioxide having an oxygen concentration below 16% and carbon dioxide content above 5%; said mixture may contain other atmospheric gases;

said fire-suppression agent, being released inside said interior in case of fire, providing said breathable fire-suppressive atmosphere with oxygen content ranging from 12% to 16% and carbon dioxide content of approximately 4% to 5%, whereby an aircraft fresh air supply system is automatically shut down;

an onboard fire and smoke detection system (285, 305) that initiates the system by opening said discharge valve(s) and shutting down the aircraft's ventilation system.

28. The system according to claim 27 wherein said storage and release system having a flexible storage container (284) inflated with said fire agent up to desired pressure and located in an airtight rigid container (282) that is communicating with the aircraft interior through an air pumping means (287);

a signal from the onboard fire detection system (285) opens the discharge valve(s) (286), releasing the fire suppression agent from the storage container into the aircraft interior while the air pumping means start pumping air contaminated with smoke from the aircraft interior into said rigid container, creating this way a positive pressure outside the storage container and forcing the entire amount of the fire agent out of it;

the excessive amount of said fire-suppressive atmosphere being released, if needed, into outside atmosphere through a pressure relief valve (290).

29. The system according to claim 27 wherein said storage and release system having a flexible storage container (302) inflated with said fire agent up to desired pressure and located in a non-airtight rigid container (304) having additional flexible container (303) inside that is deflated and communicates with the aircraft interior (301) through said air pumping means (307);

when smoke or fire being detected, the discharge valve(s) (311) open releasing the fire suppression agent from the storage container (302) into the aircraft interior and the air pumping means (307) start pumping contaminated air from the aircraft interior into said additional deflated container (303) that while being inflated, applies positive pressure on the storage container (302) and forcing the entire amount of the fire agent out of it;

the excessive amount of said fire-suppressive atmosphere being released, if needed, into outside atmosphere through pressure relief valve (310).

30. The system according to claim 27 wherein said storage and release system having a high-pressure storage container (214) filled with said fire agent and communicating with the aircraft interior (211) through the gas distribution piping (212) restricted by the discharge valve(s) that can be opened by an initiator actuated by a signal from the fire and smoke detection system;

when smoke or fire being detected, the initiator opens the discharge valve(s) releasing the fire suppression agent into the aircraft interior;

the excessive amount of said fire-suppressive atmosphere being released into outside atmosphere by pressure relief valve (215).

31. An automatic fire-extinguishing system for providing a breathable fire-preventive atmosphere on board of an aircraft or other human occupied vehicle, said system comprising an air separation device supplying vehicle's engine(s) with oxygen extracted during flight or motion from the atmospheric air; said device preferably using cryogenic technology for liquefying air and extracting part of oxygen in a centrifuge;

the remaining after separation nitrogen-enriched fraction having oxygen content of approximately 16% is provided for ventilation of the vehicle's interior, previously being warmed up to a comfortable temperature in a cooling system of the engine; said nitrogen-enriched fraction being constantly supplied into a vehicle's interior, creating there a breathable fire retarding atmosphere that excludes a possibility of an ignition and combustion.

32. The system according to claim 31 wherein the same principle being applied to an industrial and non-industrial building or facility that can use similar cryogenic oxygen-extraction system for both, producing artificial fire retarding atmosphere and generating oxygen for its own energy system; other oxygen-extraction systems having pressure or temperature-swing absorbers, membrane separators, electric current or electric field separators and various oxygen-extractors can be employed for extracting oxygen from the atmospheric air and utilizing it by a building's power plant, fuel cells, etc., allowing a cleaner combustion and higher efficiency of the power generating systems, and for producing breathable fire-extinguishing compositions.

* * * * *